(12) United States Patent
Satori et al.

(10) Patent No.: US 9,004,467 B2
(45) Date of Patent: Apr. 14, 2015

(54) LIQUID SEALED VIBRATION ISOLATING DEVICE

(75) Inventors: Kazutoshi Satori, Fujimino (JP); Yukinobu Hirano, Fujimino (JP)

(73) Assignee: Yamashita Rubber Kabushiki Kaisha, Fujimino-Shi (JP)

( * ) Notice: Subject to any disclaimer, the term of this patent is extended or adjusted under 35 U.S.C. 154(b) by 2 days.

(21) Appl. No.: 14/122,722

(22) PCT Filed: May 22, 2012

(86) PCT No.: PCT/JP2012/063012
§ 371 (c)(1),
(2), (4) Date: Nov. 27, 2013

(87) PCT Pub. No.: WO2012/165215
PCT Pub. Date: Dec. 6, 2012

(65) Prior Publication Data
US 2014/0097564 A1    Apr. 10, 2014

(30) Foreign Application Priority Data
May 31, 2011    (JP) .................... 2011-122653

(51) Int. Cl.
*F16F 13/10*    (2006.01)
(52) U.S. Cl.
CPC ............... *F16F 13/10* (2013.01); *F16F 13/106* (2013.01)
(58) Field of Classification Search
CPC ........ F16F 13/10; F16F 13/102; F16F 13/105
USPC ...................................... 267/140.11–140.15
See application file for complete search history.

(56) References Cited

U.S. PATENT DOCUMENTS

| 2002/0140143 A1* | 10/2002 | Yamamoto et al. ...... 267/140.13 |
| 2010/0072683 A1* | 3/2010 | Saito et al. ............... 267/140.13 |
| 2011/0101581 A1* | 5/2011 | Kubo et al. ............... 267/140.13 |
| 2013/0043626 A1* | 2/2013 | Satori et al. .............. 267/140.13 |

FOREIGN PATENT DOCUMENTS

| JP | 2001-200882 | 7/2001 |
| JP | 2002-089614 | 3/2002 |
| JP | 2004-251438 | 9/2004 |
| JP | 2008-185152 | 8/2008 |
| WO | 2011/145656 | 11/2011 |

* cited by examiner

*Primary Examiner* — Christopher Schwartz
(74) *Attorney, Agent, or Firm* — Rankin, Hill & Clark LLP

(57) ABSTRACT

A partition member for partitioning a primary liquid chamber and a secondary liquid chamber is provided with a damping orifice and an elastic partition member. A leg portion integrally projects from a lower surface of the movable diaphragm so as to be pressed vertically against a stopper surface formed on an upper surface of the bottom portion of a frame member. A third liquid chamber is defined between an outer circumferential portion of the leg portion and the support wall. When a bottom surface of the leg portion is pressed against the stopper surface, the third liquid chamber is sealed to confine a hydraulic fluid thereby increasing the internal pressure. When the leg portion is brought out of contact with the stopper surface, the third liquid chamber is opened to the secondary liquid chamber, thereby allowing the hydraulic fluid to flow out of the third liquid chamber.

20 Claims, 14 Drawing Sheets

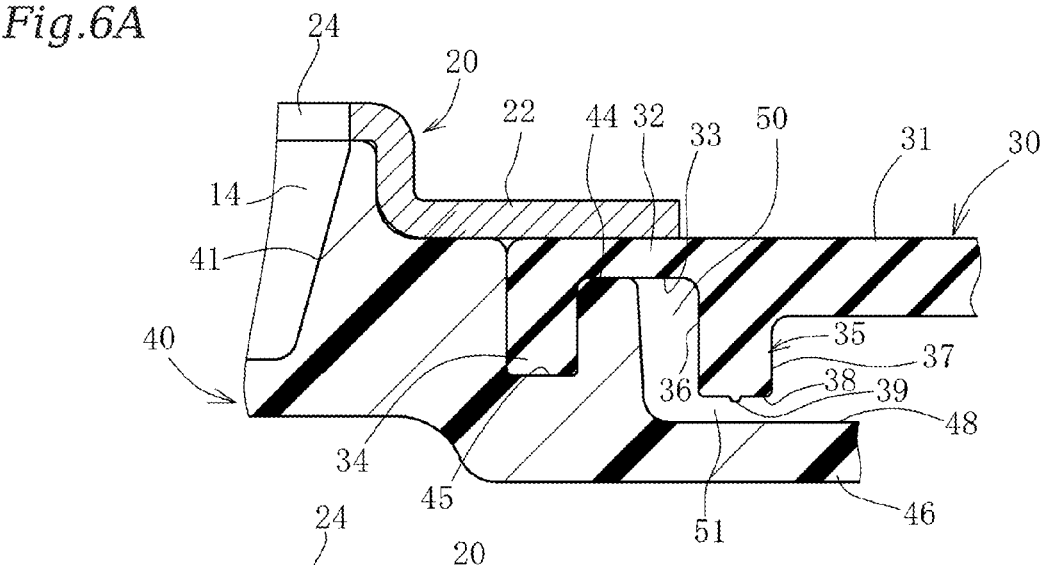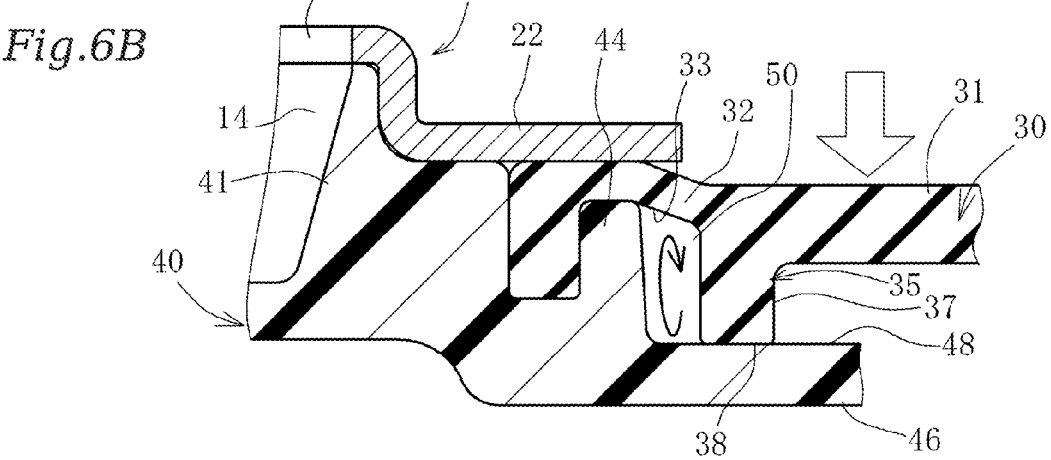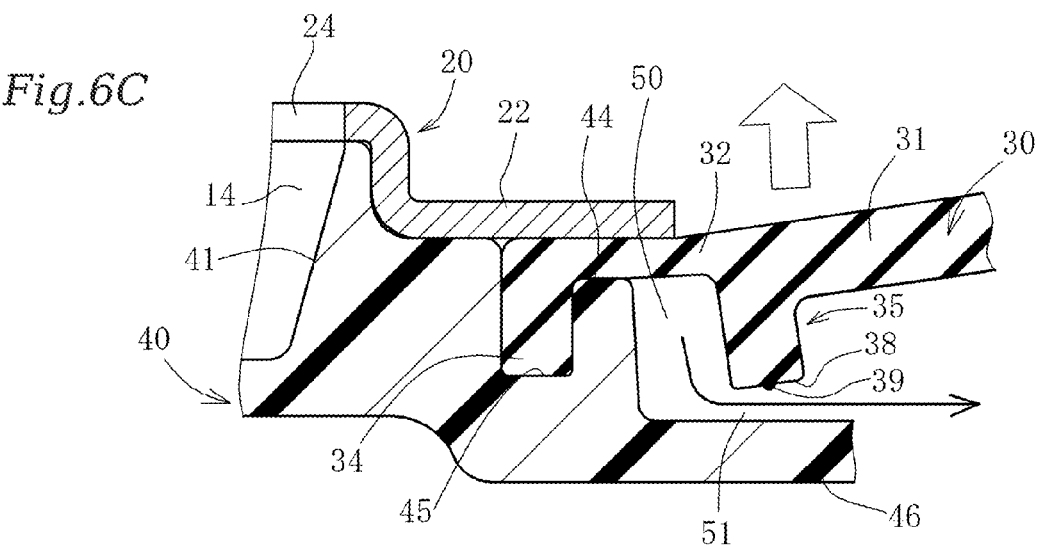

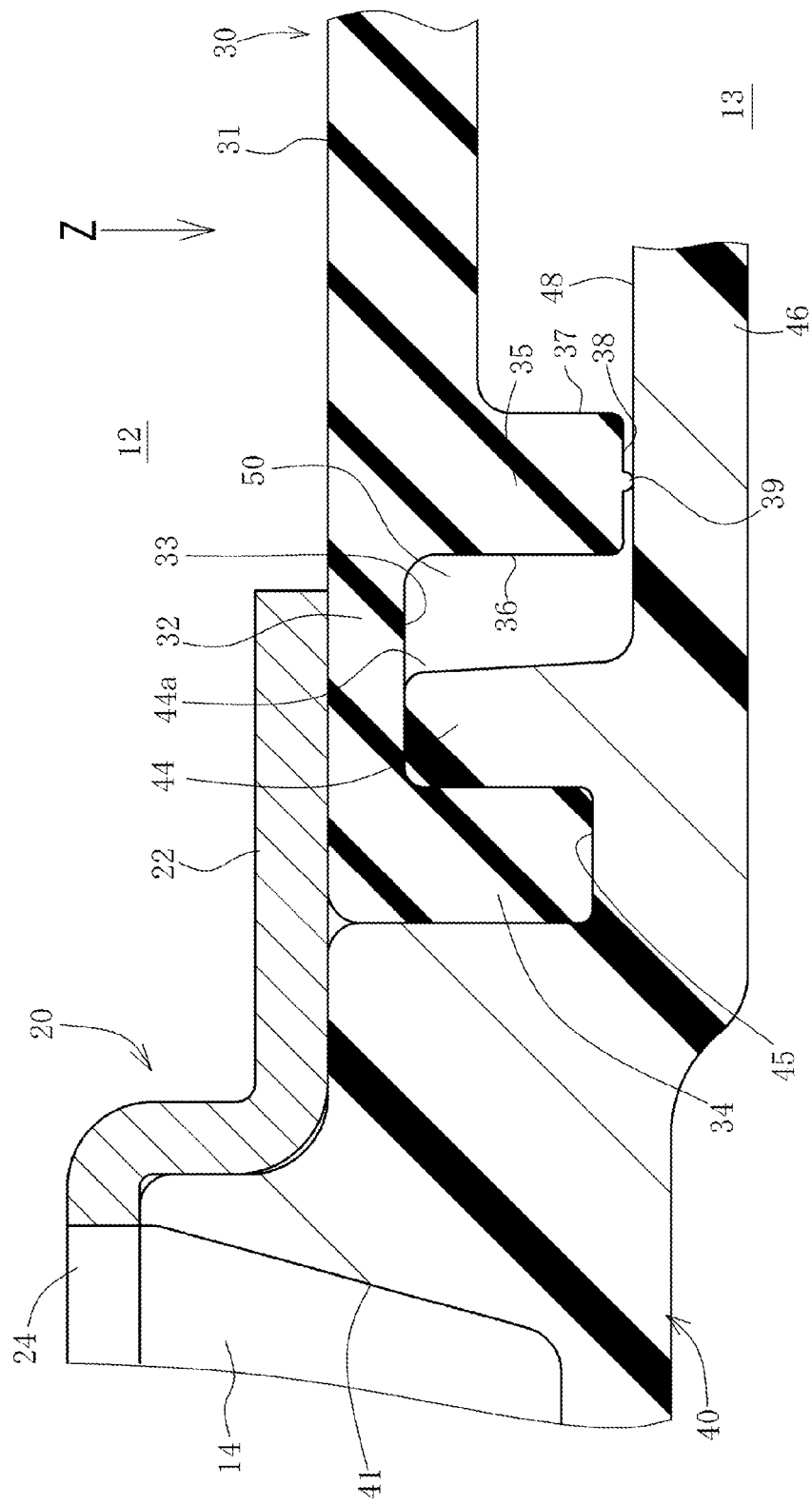

LIQUID SEALED VIBRATION ISOLATING DEVICE

TECHNICAL FIELD

The present invention relates to a liquid sealed vibration isolating device for use in an engine mount, etc. for a motor vehicle, and more particularly, to the device that produces resonance by utilizing a movable diaphragm provided as an elastic diaphragm for absorption of internal pressure, thereby to improve a dynamic characteristic.

BACKGROUND ART

As this kind of liquid sealed vibration isolating device, there is publicly known the art of the type that a damping orifice for connecting a primary liquid chamber and a secondary liquid chamber is provided in a partition member which separates the primary liquid chamber and the secondary liquid chamber, and a movable diaphragm is provided for absorbing liquid pressure fluctuation of the primary liquid chamber.

There is also publicly known the art that a leg portion a tip of which projects outward in a radial direction is provided on a lower surface (a secondary liquid chamber side, and the same shall apply hereinafter.) of the movable diaphragm, and the tip of the leg portion is pressed against a pressed portion provided on a support member of the movable diaphragm. In this case, the pressed portion is formed with a taper surface which protrudes toward a center side of the secondary liquid chamber, and at the time of large deformation of the movable diaphragm the leg portion is compressed harder to increase a spring constant of the movable diaphragm (see a patent reference 1).

Further, there is publicly known the art that a damping orifice and an idle orifice are provided and, when idling, a secondary liquid chamber side opening of the idle orifice is opened through an opening and closing valve to produce resonance within the idle orifice thereby to damp the input of idle vibration.

PRIOR ART REFERENCE

Patent reference 1: Japanese patent application laid open publication No. 2001-200882.

DISCLOSURE OF THE INVENTION

Problem to be Solved by the Invention

By the way, in the case where the leg portion is provided as disclosed in the patent reference 1 and the spring constant of the movable diaphragm is made variable in proportion to the amount of elastic deformation, the high damping can be achieved, when the spring constant of the movable diaphragm is changed non-linearly, such that with respect to the input of small amplitude vibration the dynamic spring is decreased by the elastic deformation of the movable diaphragm of a weak spring constant thereby to effectively absorb the internal pressure, and with respect to the input of large amplitude vibration, the hydraulic fluid is fed in a larger amount to the damping orifice by the movable diaphragm of a strong spring constant thereby to improve resonance efficiency.

However, even if the movable diaphragm having the non-linear spring characteristic is used, only the decrease in dynamic spring with respect to the small amplitude vibration and the high damping by the damping orifice can be achieved, while it is not useful for interception of the vibration transmission with respect to the idle vibration in a different frequency range from the resonance frequency in the damping orifice.

In order to intercept the idle vibration, it is thought that the idle orifice which resonates in the idle resonance range is provided in addition to the damping orifice and it is operated by the opening and closing valve to produce the resonance at the time of idling. This structure is effective in the interception of the idle vibration, but it requires the provision of the idle orifice and the opening and closing mechanism thereof, whereby it is complicated and costly that much.

Accordingly, without provision of a second orifice passage such as the idle orifice other than the damping orifice, and of the valve mechanism for opening and closing the passage, it is required to have the same effect, by the structure of only the damping orifice and the movable diaphragm, as there are provided the second orifice passage and the valve opening and closing mechanism. Moreover, it is more desirable that the conventionally provided leg portion of the movable diaphragm is utilized for such requirement.

It is therefore an object of the present invention to fulfill the above requirement by utilizing the movable diaphragm provided with the conventionally existing leg portion.

Means for Solving the Problem

In order to achieve the above object, according to a first aspect of the present invention, a liquid sealed vibration isolating device comprises a first mounting member being mounted on the vibration source side, a second mounting member being mounted on the vibration transmission side, an elastic main body being provided between the first and second mounting members, a liquid chamber having a portion of a wall formed with the elastic main body, a partition member for partitioning the liquid chamber into a primary liquid chamber and a secondary liquid chamber, a damping orifice communicating between the primary liquid chamber and the secondary liquid chamber and producing a first resonance by a predetermined low frequency vibration, a movable diaphragm being provided on at least a portion of the partition member and elastically deformable to absorb a change in internal pressure of the primary liquid chamber, and a leg portion integrally projecting from an outer circumferential portion on the secondary liquid chamber side of the movable diaphragm and being pressed against a pressed portion formed on a portion of a frame member which is provided for fixing a circumference of the partition member, characterized in that a third liquid chamber (50) is provided between the leg portion (35) and the frame member (40), and an openable and closable orifice clearance (51) which communicates with the third liquid chamber (50), is formed between the leg portion (35) and the pressed portion (60, 70), wherein the orifice clearance (51) is closed when the leg portion (35) comes in contact with the pressed portion (60, 70), to close up the third liquid chamber (50) tightly while it is opened when the leg portion (35) is brought out of contact with the pressed portion (60, 70), to open the third liquid chamber (50), and wherein a second resonance which resonates at a different frequency from the first resonance produced by the damping orifice (14) is produced in the orifice clearance (51) due to a flow of a hydraulic fluid by the opening and closing of the third liquid chamber (50).

According to a second aspect of the present invention, a liquid sealed vibration isolating device is formed as an engine mount, and the second resonance resonates in an idle vibration range.

According to a third aspect of the present invention, a part of the leg portion (35) to come in contact with the pressed portion (60) is an outer lateral surface (36) of the leg portion (35).

According to a fourth aspect of the present invention, a part of the leg portion (35) to come in contact with the pressed portion (60) is a lower surface (38) of the leg portion (35) located closest to the secondary liquid chamber (13) in an input direction of a main vibration and comes vertically in contact with a surface (48) which lies at right angles to the input direction of the main vibration.

According to a fifth aspect of the present invention, a part of the leg portion (35) to come in contact with the pressed portion (70) is an inner lateral surface (37) of the leg portion (35).

According to a sixth aspect of the present invention, a surface of the pressed portion (60) to come in contact with the leg portion (35) includes a taper surface (61) which is expanded in a radial direction on the side of the primary liquid chamber (12).

According to a seventh aspect of the present invention, the part of the leg portion (35) to come in contact with the pressed portion (60) is provided with a taper surface (d) which is narrowed in a radial direction on the side of the secondary liquid chamber (13).

According to an eighth aspect of the present invention, an annular projection (39, 39A, 39B) which comes in contact with the pressed portion (60, 70) is integrally provided on the surface of the leg portion (35).

According to a ninth aspect of the present invention, a surface of the pressed portion (70) to come in contact with the leg portion (35) includes a taper surface (71) which is narrowed in a radial direction on the side of the primary liquid chamber (12).

According to a tenth aspect of the present invention, the part of the leg portion (35) to come in contact with the pressed portion (70) is provided with a taper surface (e) which is expanded in a radial direction on the side of the secondary liquid chamber (13).

According to an eleventh aspect of the present invention, the pressed portion (60, 70) is provided with a round shaped portion (62, 72) continuously connected to the taper surface (61, 71) and functioning as a deformation controlling means of the leg portion (35).

According to a twelfth aspect of the present invention, when the orifice clearance (51) is created between the leg portion (35) and the pressed portion (60, 70) by a rise in internal pressure in the closed condition of the third liquid chamber (50) at the time of a rise in internal pressure of the primary liquid chamber (12) due to the first resonance in the damping orifice (14), the second resonance is produced by the hydraulic fluid flowing from the third liquid chamber (50).

According to a thirteenth aspect of the present invention, in a neutral condition that the vibration is not inputted to the primary liquid chamber (12), the leg portion (35) comes in contact with the pressed portion (60, 70) to close the third liquid chamber (50).

According to a fourteenth aspect of the present invention, when the primary liquid chamber (12) is converted from a plus vibration that the internal pressure rises to a minus vibration that the internal pressure drops, the leg portion (35) is brought out of contact with the pressed portion (60, 70) to open the third liquid chamber (50) through the orifice clearance (51).

Effects of the Invention

According to the first aspect of the present invention, when the leg portion has contacted the pressed portion at the time of the deformation of the movable diaphragm by the input of the vibration to the liquid sealed vibration isolating device, the internal pressure of the third liquid chamber is raised by allowing the third liquid chamber to be closed up. Thereafter, when being released from the closing condition due to the deformation of the movable diaphragm, the hydraulic fluid flows out of the third liquid chamber. Then, the flow of the hydraulic fluid produces the second resonance different from the first resonance by the damping orifice. Therefore, it is possible to have two high damping or low dynamic spring characteristics by the first and second resonance.

According to the second aspect of the present invention, the liquid sealed vibration isolating device is formed as the engine mount, and the second resonance is tuned in such a way as to occur in the idle vibration range. Therefore, without provision of an idle orifice and an opening closing mechanism thereof, two types of resonance can be fulfilled simply by combination of the conventional damping orifice and the movable diaphragm, and the idle vibration can be effectively intercepted.

According to the third aspect of the present invention, since the outer lateral surface which is a lowest area in rigidity of the leg portion is formed as a portion to come in contact with the pressed portion, the increase in spring constant of the movable diaphragm is controlled in comparison with the case where another portion is brought into contact with the pressed portion, whereby the comparatively low dynamic spring can be obtained.

According to the fourth aspect of the present invention, when the movable diaphragm is elastically deformed in the direction of the main vibration due to the input of vibration to the liquid sealed vibration isolating device, the lower surface of the leg portion can come vertically in contact with the surface of the pressed portion which lies at right angles to the input direction of the main vibration. Therefore, the closed condition of the third liquid chamber can be more reliably ensured.

According to the fifth aspect of the present invention, it is possible to use the high spring constant range of the movable diaphragm by allowing the inner lateral surface, which is a highest area in rigidity on the root of the leg portion, to come in contact with the pressed portion, whereby the high damping can be fulfilled.

According to the sixth aspect of the present invention, the contact amount of the leg portion with respect to the taper surface of the pressed portion changes non-linearly in accordance with the size of the input of vibration to the liquid sealed vibration isolating device, so that the spring constant of the movable diaphragm can be changed non-linearly. At the same time, when turning the third liquid chamber into a tightly closed space and pressurizing the hydraulic fluid within the third liquid chamber, the internal pressure can be increased.

According to the seventh aspect of the present invention, since the part of the leg portion to come in contact with the pressed portion is formed into the taper surface so as to increase the contact amount of the leg portion relative to the pressed portion, the contact amount between the leg portion and the pressed portion changes non-linearly at the time of deformation of the movable diaphragm due to the input of vibration to the liquid sealed vibration isolating device, so that the spring constant of the movable diaphragm can be changed non-linearly.

Therefore, at the time of large deformation, the deformation control of the movable diaphragm is strengthened so as to increase the amount of the hydraulic fluid flowing to the damping orifice, so that an effective resonance in the damping orifice can be created, while at the time of small deformation, the influence on the spring constant of the movable diaphragm due to the contact between the leg portion and the pressed portion is reduced to control the increase in spring constant of the movable diaphragm, so that the decrease in dynamic spring can be fulfilled.

According to the eighth aspect of the present invention, the internal pressure created in the third liquid chamber can be more raised by improving the sealing characteristic keeping the third liquid chamber in the tightly closed condition at the time of contact between the leg portion and the pressed portion. Moreover, the increase in spring constant of the movable diaphragm at the time of the contact is controlled by allowing a ring-shaped projection to come in contact with the pressed portion, whereby both the low dynamic spring and the high sealing characteristic can be achieved.

According to the ninth aspect of the present invention, the contact amount of the leg portion with respect to the taper surface of the pressed portion changes non-linearly in accordance with the size of the input of vibration to the liquid sealed vibration isolating device, so that the spring constant of the movable diaphragm can be changed non-linearly. At the same time, when turning the third liquid chamber into a tightly closed space and pressurizing the hydraulic fluid within the third liquid chamber, the internal pressure can be increased.

According to the tenth aspect of the present invention, since the part of the leg portion to come in contact with the pressed portion is formed into the taper surface thereby to increase the contact amount of the leg portion relative to the pressed portion, the contact amount between the leg portion and the pressed portion changes non-linearly at the time of deformation of the movable diaphragm due to the input of vibration to the liquid sealed vibration isolating device, so that the spring constant of the movable diaphragm can be changed non-linearly.

Therefore, at the time of large deformation, the deformation control of the movable diaphragm is strengthened so as to increase the amount of the hydraulic fluid flowing to the damping orifice so that an effective resonance in the damping orifice can be created, while at the time of small deformation, the influence on the spring constant of the movable diaphragm due to the contact between the leg portion and the pressed portion is reduced thereby to control the increase in spring constant of the movable diaphragm so that the decrease in dynamic spring can be fulfilled.

According to the eleventh aspect of the present invention, since the deformation of the movable diaphragm at the time of the large deformation is strongly controlled, the amount of the hydraulic fluid flowing to the damping orifice is increased further so that the effective resonance in the damping orifice can be created.

According to the twelfth aspect of the present invention, when the damping orifice creates the first resonance, the fluctuation of the internal pressure of the primary liquid chamber is increased at the time of anti-resonance due to that. Then, the elastic deformation of the movable diaphragm is increased accordingly and the third liquid chamber is tightly closed when the leg portion comes in contact with the pressed portion. Thereafter, when the third liquid chamber is opened, the hydraulic fluid flows out of the third liquid chamber. This flow of the hydraulic fluid creates the second resonance. Thus, the second resonance can be created by utilizing the first resonance of the damping orifice.

According to the thirteenth aspect of the present invention, since the leg portion comes in contact with the pressed portion in the neutral condition to close the third liquid chamber, the third liquid chamber is pressurized immediately by the plus vibration that an input load is applied to the primary liquid chamber. Thus, the second resonance can be created through the small amplitude vibration.

According to the fourteenth aspect of the present invention, since, when the primary liquid chamber is converted from the plus vibration to the minus vibration, the leg portion is brought out of contact with the pressed portion to open the third liquid chamber through the orifice clearance, the second resonance can be created by the flow of the hydraulic fluid in the orifice clearance also at the time of the small amplitude vibration.

BRIEF DESCRIPTION OF THE DRAWINGS

FIGS. 6A, 6B and 6C are explanatory views of the operation according to the first embodiment;

FIG. 12 is a cross sectional view of a region similar to FIG. 6A according to a fourth embodiment;

BEST MODE FOR CARRYING OUT THE INVENTION

Figure 3:
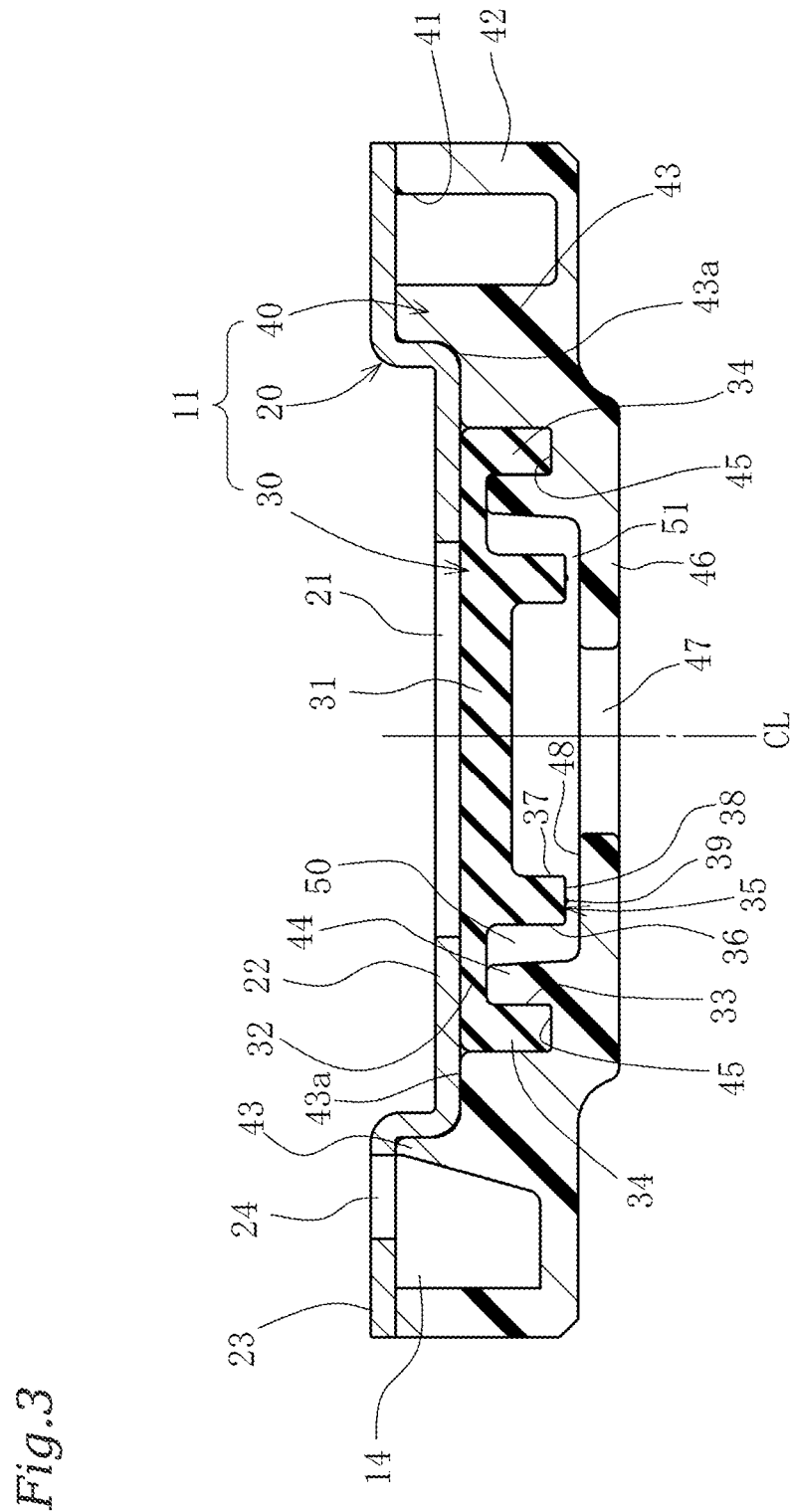
FIG. 3 is a cross sectional view taken along line 3-3 of FIG. 2.
Figure 4:
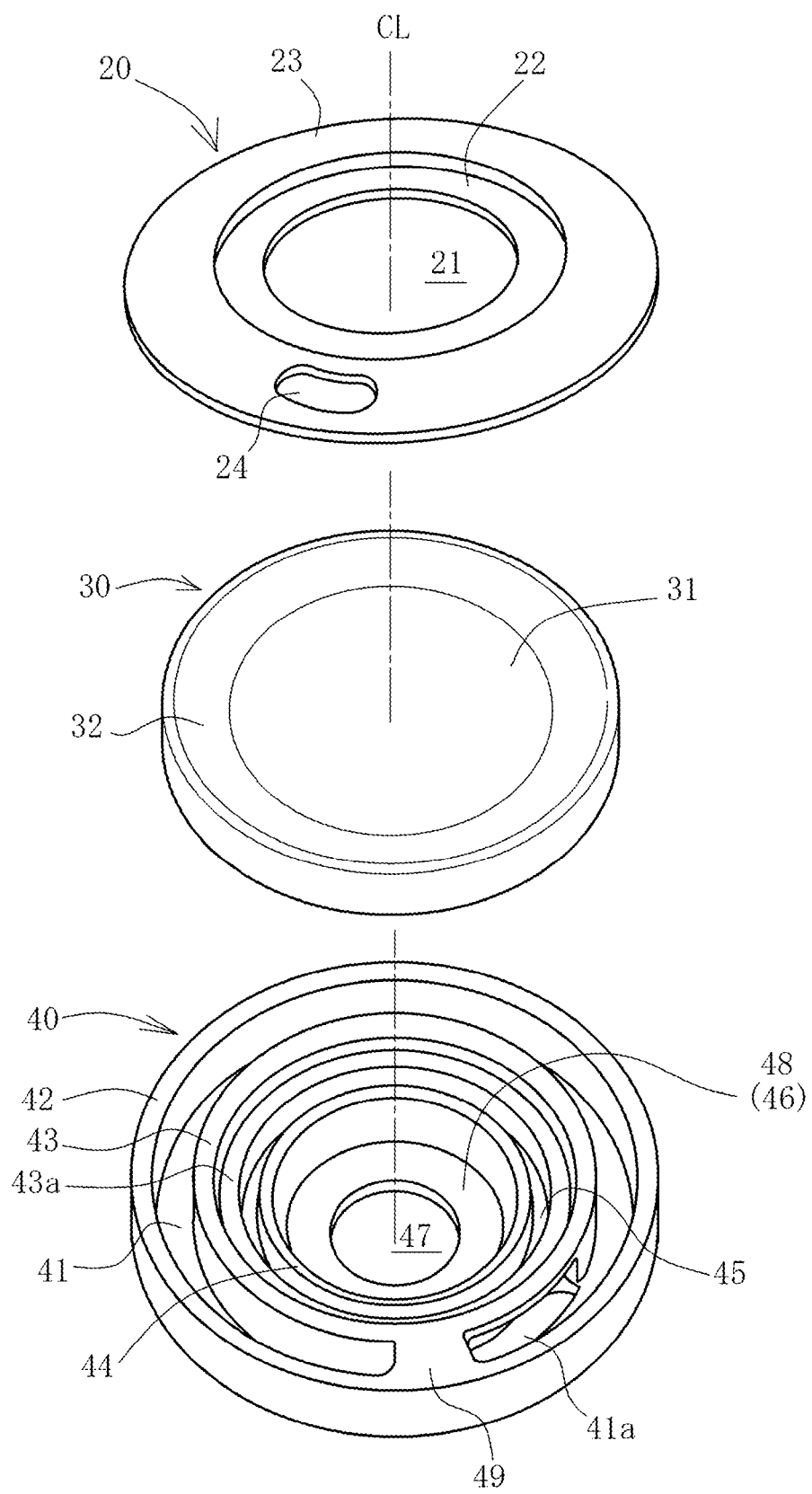
FIG. 4 is an exploded perspective view of the partition member, showing each of component elements according to the first embodiment in a perspective view.
Figure 5:
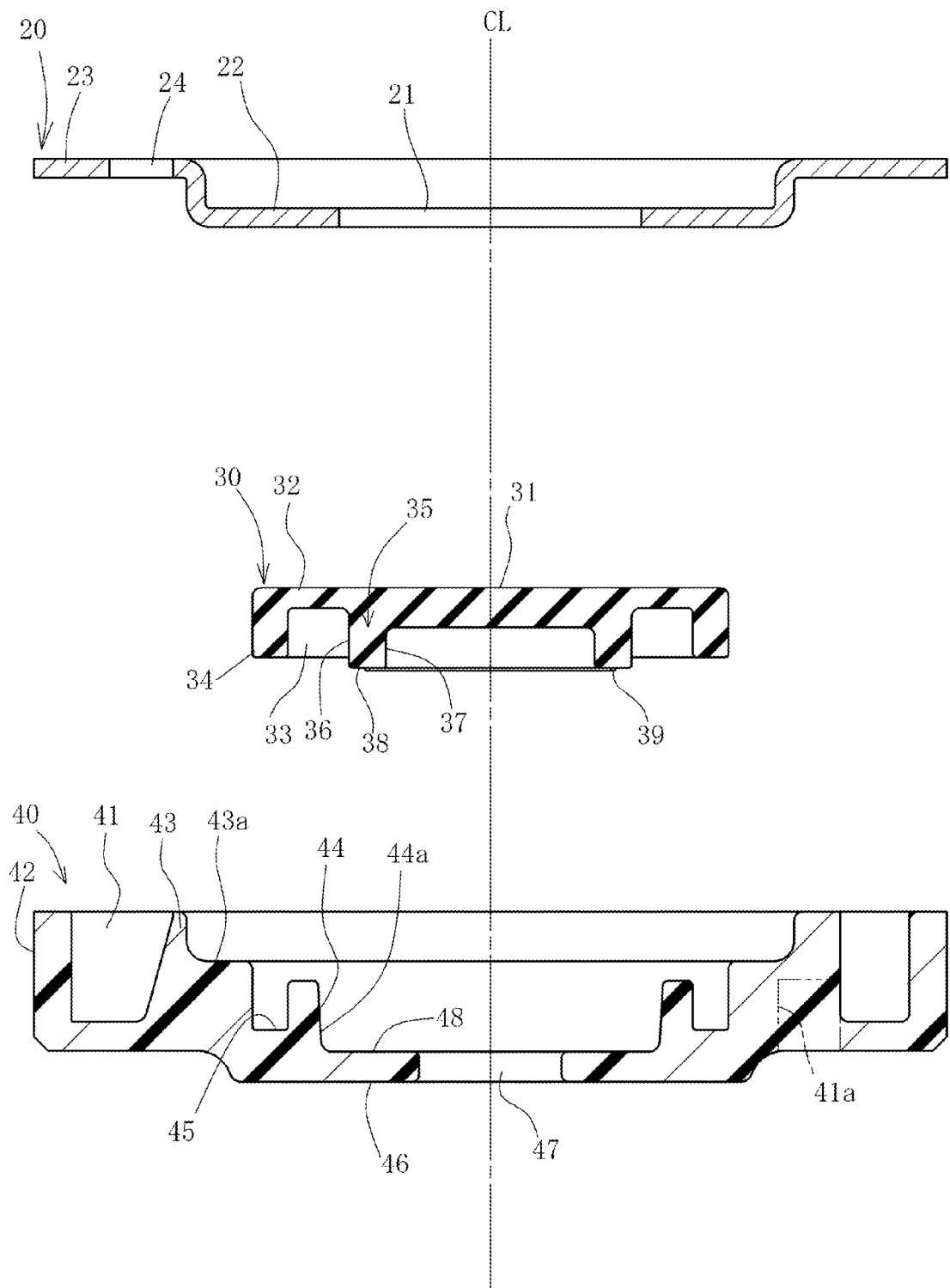
FIG. 5 is an exploded cross sectional view showing each of component elements according to the first embodiment in a cross section.

Hereinafter, embodiments of the present invention configured as an engine mount for a motor vehicle equipped with a three cylinder engine will be described with reference to accompanying drawings. At first, a first embodiment will be described with reference to FIGS. 1 through 7, wherein FIG. 1 is a cross sectional view taken along a center line CL (which is parallel to a Z direction corresponding to an input direction of a main vibration) of an engine mount according to a first embodiment of the present invention, FIG. 2 is a plan view of a partition member, FIG. 3 is a cross sectional view taken along line 3-3 of FIG. 2, FIG. 4 is an exploded perspective view of the partition member, FIG. 5 is an exploded cross sectional view of the partition member, and FIGS. 6 and 7 are explanatory views of the operation.

Figure 1:
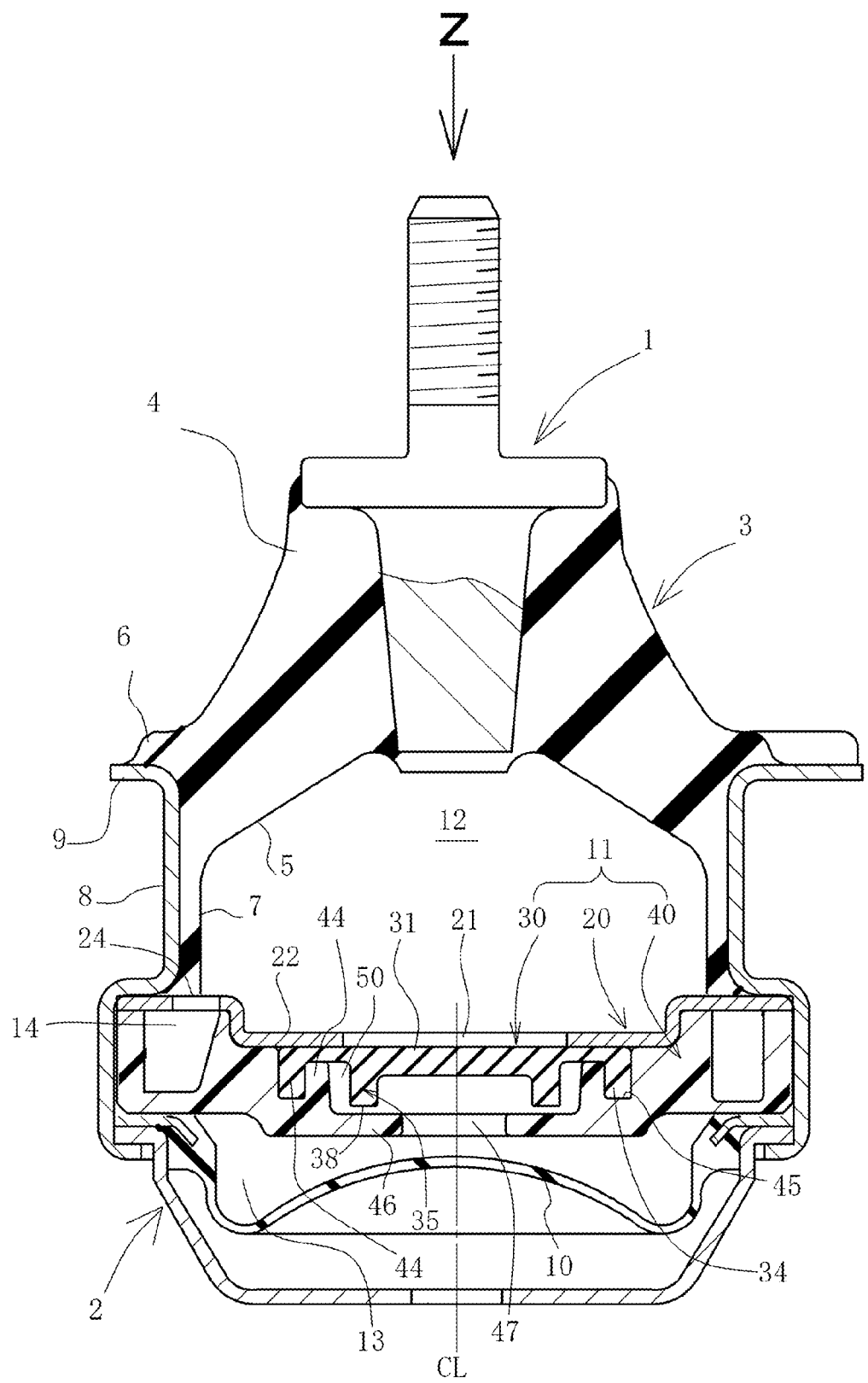
FIG. 1 is a cross sectional view of an engine mount according to a first embodiment of the present invention.

In the description hereunder, an upper and lower sides of a liquid sealed vibration isolating device and of each component element thereof are set on the basis of the state illustrated in FIG. 1, wherein an upper side designates a primary liquid chamber side and a lower side designates a secondary liquid chamber side with respect to the partition member.

Besides, in the present invention, a low frequency is a range of about 5 to 30 Hz, and a higher frequency range than this range is referred to as a medium/high frequency range. In this low frequency range, the range in the vicinity of 10 Hz is a vibration range inputted from a suspension at the time of travelling, and the range in the vicinity of 15 Hz is an idle vibration range.

Further, with respect to the amplitude of input vibration, the amplitude not more than ±0.2 mm is regarded as small amplitude, the amplitude of about ±0.2 mm to ±1.5 mm as medium amplitude, the amplitude of about ±1.5 mm to ±2.0 mm as large amplitude, and the amplitude above ±2.0 mm as excessive amplitude. However, frequency divisions of the frequency range and sizes of the amplitude are expedient matters to be fixed by specifications of an engine or the like and are to be determined properly with respect to each of engines and vehicles being used.

Furthermore, the vibration which pressurizes the primary liquid chamber when a load is applied to the engine mount is referred to as a positive pressure side vibration or a plus (+) vibration, and the vibration in a reverse direction is referred to as a negative pressure side vibration or a minus (−) vibration.

In FIG. 1, this engine mount comprises a first mounting member 1 mounted on the side of an engine as a vibration generating source, a second mounting member 2 mounted on the side of a vehicle body as a vibration transmitted side, and an elastic main body 3 configured to connect the first and second mounting members and to be integrally combined with them. The elastic main body 3 is a member in the shape of a substantially circular cone formed of a publicly known elastic material such as rubber or the like. On the top of this circular cone portion 4 the first mounting member 1 is integrally implanted.

An inside surface 5 of the circular cone portion 4 forms an internal wall surface facing a liquid chamber which is stated hereafter. The circumference of a hem portion of the circular cone portion 4 is formed with a flange 6. A lower portion below the flange 6 extends further downward to form a lining portion 7. The flange 6 is integrally combined with a flange 9 of a cylindrical side wall portion 8 which forms a part of the second mounting member 2. The lining portion 7 covers an internal surface of the side wall portion 8.

The inside of the elastic main body 3 defines a downwardly open space and this open space is closed with a diaphragm 10 to form a liquid chamber inside thereof. This liquid chamber is divided by a partition member 11 into a primary liquid chamber 12 on the side of the elastic main body 3 and a secondary liquid chamber 13 on the side of the diaphragm 10. These liquid chambers are connected with each other by a damping orifice 14 for absorbing low frequency vibrations, which is formed in an outer circumferential portion of the partition member 11. The liquid chambers are filled with publicly known incompressible hydraulic fluid such as water or the like. An input direction Z of a principal vibration to be inputted to the engine mount extends from the first mounting member 1 to the primary liquid chamber 12 in parallel to the center line CL of the engine mount which is an axis of the first mounting member 1, and lies at substantially right angles to a surface of the partition member 11 facing the primary liquid chamber 12.

The partition member 11 is formed with three components comprising a cover member 20, an elastic partition member 30 of a proper elastic material such as rubber or the like, and a substantially cup shaped frame member 40 for supporting the elastic partition member 30. The cover member 20 functions as a lid to be put on the elastic partition member 30. A central opening 21 is formed in a central region of the cover member 20. Around the central opening 21 there is formed a step portion 22 which is lowered one step below an outer circumferential side. An opening 24 of the damping orifice 14 on the side of the primary liquid chamber 12 is provided on an outer circumferential portion 23 (see FIG. 3) located on the outer circumferential side of the step portion 22.

As shown in FIGS. 2 to 5, the elastic partition member 30 comprises a central portion forming a movable diaphragm 31, an outer circumferential portion 32 located on the circumferential side of the central portion and formed with a ring shaped groove 33 which is opened downward by being hollowed from the bottom surface side thereof, and a circumferential wall 34 located on the outer circumferential side across the ring shaped groove 33. A leg portion 35 is located on the inner circumferential side of the ring shaped groove 33.

Figure 2A:
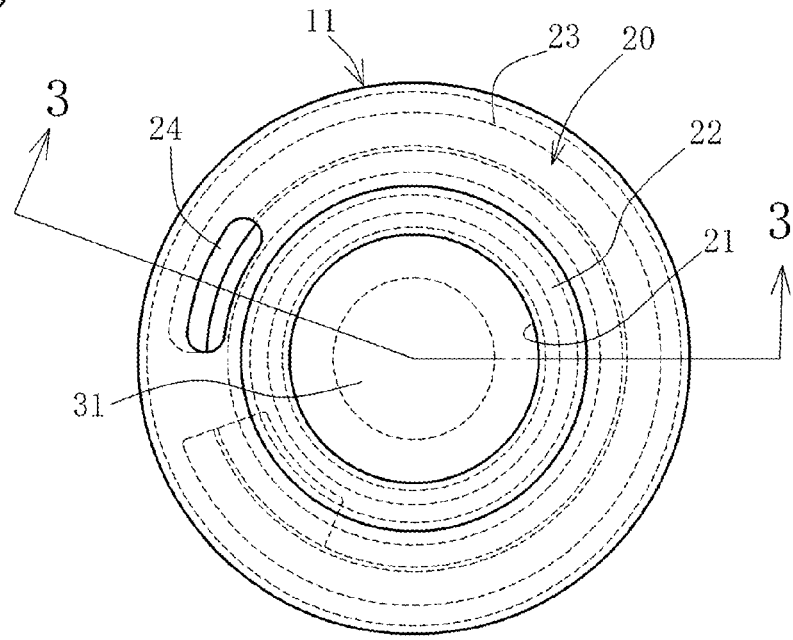
FIGS. 2A, 2B and 2C are views showing a partition member according to the first embodiment.
Figure 2B:
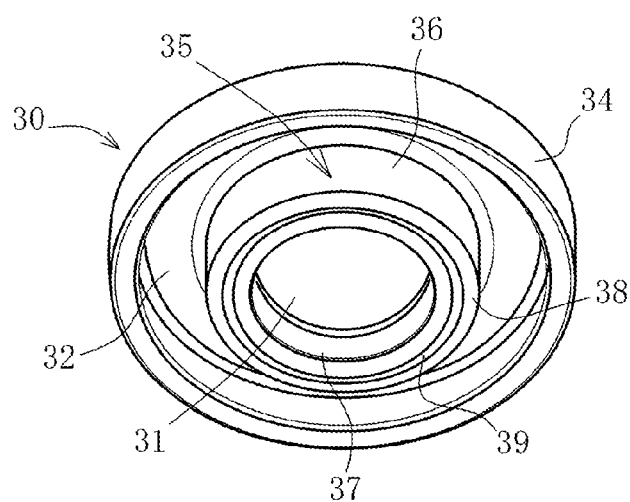
Figure 2C:
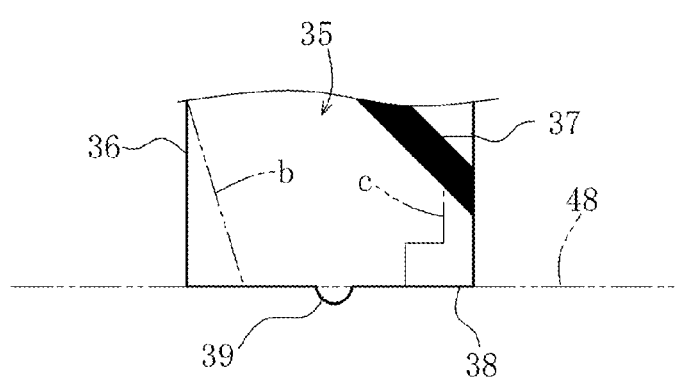

By the way, in FIG. 2A is a plan view of the elastic partition member 30, FIG. 2B being a perspective view thereof viewed from an underside, and FIG. 2C is an enlarged cross sectional view of the leg portion 35.

The movable diaphragm 31 faces the primary liquid chamber 12 through the central opening 21 of the cover member 20 and forms a portion which is capable of being elastically deformed enough to absorb the change of internal pressure of the primary liquid chamber 12 in proportion to the elastic deformation of the elastic main body 3. The upper surface of the movable diaphragm 31 is formed in a substantially flat surface shape while the lower surface thereof is formed with an upwardly recessed concave portion the circumference of which is surrounded with the leg portion 35. By the way, the lower surface may be formed with a curved surface which is thinnest at the center thereof.

The leg portion 35 is formed integral with the outer circumference of the movable diaphragm 31 on the bottom surface side of the elastic partition member 30 and projects downward in a cylindrical shape. The leg portion 35 forms an annular wall facing the circumferential wall 34 across the ring-shaped groove 33 and has an outer lateral surface 36 facing the circumferential wall 34, an inner lateral wall 37 on the opposite side thereof and a bottom surface 38. The outer lateral wall 36 and the inner lateral wall 37 are in the shape of a circumferential wall, respectively.

The bottom surface 38 functions as a pressing portion at the time of elastic deformation and has the form of an approximately horizontal flat surface. As shown in detail in FIG. 2B and FIG. 2C, the bottom surface 38 is integrally formed with a downward projecting seal rib 39. The seal rib 39 is in an annular shape concentric with the bottom surface 38 and is formed on the circumference of the bottom surface 38.

Incidentally, although the cross section of the leg portion 35 is formed in a substantially rectangular shape, various shapes may be adopted. For instance, at least one of the inner and outer circumferential surfaces may be formed in a taper shape tapering off in the downward direction as shown by a phantom line b in FIG. 2C or in a step shape gradually narrowing the width in the downward direction as shown by a line c. With such structure, non-linear spring characteristics can be demonstrated when the leg portion 35 is elastically deformed.

A third liquid chamber 50 of an annular space is formed by the ring shaped groove 33. This third liquid chamber 50 is surrounded with the outer circumferential portion 32 and the outer lateral wall 36 of the leg portion 35 of the elastic partition member 30, and an annular support wall 44. The third liquid chamber 50 is opened at a lower portion thereof at the time of the small deformation (when the vibration not less than the predetermined amplitude is not inputted and the elastic deformation of the movable diaphragm is small), while it is closed by allowing the bottom surface 38 to come in tight contact with the frame member 40 at the time of the large deformation (when the vibration not less than the predetermined amplitude is inputted and the elastic deformation of the movable diaphragm 31 is large).

The frame member 40 is formed of a metal such as a light alloy, etc. or a proper rigid material such as resin, etc. In the outer circumferential region of the frame member 40 an upwardly opened annular groove 41 is formed between an outer circumferential wall 42 and an inner circumferential wall 43 opposed thereto to constitute the damping orifice 14 in cooperation with the cover member 20. The annular support wall 44 is formed on the inside of and spaced apart from the inner circumferential wall 43. Between this support wall 44 and the inner circumferential wall 43 there is provided an upwardly opened annular support groove 45. An upper end of the support wall 44 is lower than a step 43a which is formed on the inner circumferential side of an upper end region of the inner circumferential wall 43.

A bottom portion 46 on the inside of the support wall 44 is formed one step lower than the bottom on the outer circumferential side thereof. In the center region of the bottom portion 46, there is provided a central opening 47 on the frame member side. A stopper surface 48 is formed on the upper surface of the bottom portion 46 in a circumferential region of the central opening 47. The stopper surface 48 is a pressed surface against which the bottom surface 38 of the leg portion 35 is pressed, and is formed as a substantially flat surface against which the bottom surface 38 of the leg portion 35 is pressed in a substantially vertical direction (in parallel to the Z direction).

As shown in FIG. 4, the annular groove 41 is not formed on a full circumference, and both ends in the circumferential direction are separated by a connecting portion 49 which partially connects the outer circumferential wall 42 and the inner circumferential wall 43. One of both ends in the circumferential direction of the annular groove 41 located on both sides of the connecting portion 49 communicates through an opening 41a on the secondary liquid chamber side with the secondary liquid chamber 13. As shown by a phantom line in FIG. 5, the opening 41a on the secondary liquid chamber side is formed by hollowing out the inner circumferential wall 43 in the vicinity of the connecting portion 49 in such a way as to communicate from the outer circumference side with the secondary liquid chamber 13.

The stopper surface 48 stops the bottom surface 38 of the leg portion 35 which is pressed in the substantially vertical direction, so that the leg portion 35 is compressed by a press reaction force from the side of the stopper surface 48 and its compression amount changes. As a result, when the compression amount increases, the spring constant of the movable diaphragm 31 is increased thereby to prevent the free elastic deformation. Thus, the stopper surface 48 functions as a deformation control section of the movable diaphragm 31.

Incidentally, this deformation control section is functionally differentiated by the displacement amount of the leg portion 35, namely, the amplitude of the input vibration. At the time of the small amplitude, the leg portion 35 is spaced apart from the stopper surface 48 so as not to be pressed thereon. At the time of the medium amplitude, it is pressed on the stopper surface 48. When the input vibration is not less than the medium amplitude, it is pressed on the stopper surface 48 at the time of the plus vibration, while the bottom surface 38 moves away from the stopper surface 48 in the upward direction at the time of minus vibration.

As shown in FIGS. 4 and 5, when the elastic partition member 30 is put on the frame member 40 so as to allow the circumferential wall 34 to be engaged with the support groove 45 and then the cover 20 is put on the elastic partition member 30, these three components are combined and assembled into the partition member 11 as shown in FIGS. 2 and 3.

In this assembled state, as shown in FIG. 3, the circumferential wall 34 of the elastic partition member 30 is fitted into the support groove 45 and fixed by allowing the upper end thereof to be pressed by the step portion 22 of the cover member 20. Also, the leg portion 35 is located in the inner circumferential side of the support wall 45, and the bottom surface 38 thereof is pressed against the stopper surface 48.

The annular groove 41 has the upper side thereof closed with the outer circumferential portion 23 of the cover member 20 thereby to form the damping orifice 14. This damping orifice 14 communicates through one opening 24 with the primary liquid chamber 12 and also communicates through the other opening 41a (see FIG. 4) with the secondary liquid chamber 13, whereby it is tuned such that the input vibration produces the first resonance at the predetermined low frequency.

In the inside region of the shoulder portion of the circumferential wall 34 of the elastic partition member 30, the outer circumferential portion 32 is held between the step portion 22 of the cover member 20 and the upper end portion of the support wall 44. The step portion 22 is positioned on the step portion 43a of the inner circumferential wall 43. An inner circumferential edge of the step portion 22 facing the central opening 21 projects a little to the center side with respect to the upper end portion of the support wall 44. A portion of the outer circumferential portion 32 held between these components is thin and easily elastically deformable. Therefore, at the time of the plus vibration, it is bent downward about the upper end portion of the support wall 44 serving as a fulcrum, while, at the time of the minus vibration, it is bent upward about the inner circumferential edge of the step portion 22 as a fulcrum, so that the movable diaphragm 31 located on the inner circumferential side is capable of being elastically deformed.

The leg portion 35 and the movable diaphragm 31 are positioned inside the central opening 21. The movable diaphragm 31 faces the primary liquid chamber 12 directly and the internal pressure of the primary liquid chamber 12 is directly transmitted to the movable diaphragm 31 so that the movable diaphragm 31 is elastically deformed to absorb a rise in the hydraulic pressure of the primary liquid chamber 12. The lower surface of the movable diaphragm 31 faces the secondary liquid chamber 13 through the central opening 47 as well. The leg portion 35 is positioned above the stopper surface 48 to overlap with each other in the vertical direction.

The third liquid chamber 50 filled with the hydraulic fluid on the side of the secondary liquid chamber 13 is defined inside the ring-shaped groove 33 formed between the circumferential wall 34 and the leg portion 35. When the primary liquid chamber 12 and the secondary liquid chamber 13 are the first and second liquid chambers, this third liquid chamber 50 is designated as the third liquid chamber following them. The third liquid chamber 50 is closed when the bottom surface 38 of the leg portion 35 is pressed on the stopper surface 48, while it is opened to the secondary liquid chamber 13 when the bottom surface 38 of the leg portion 35 is brought out of contact with the stopper surface 48.

Further, when the bottom surface 38 of the leg portion 35 is pressed more strongly against the stopper surface 48 in the closed condition of the third liquid chamber 50, the volume of the third liquid chamber 50 is decreased due to the compressive deformation of the third liquid chamber 50 whereby the hydraulic fluid kept within the third liquid chamber 50 is pressurized.

However, since the hydraulic fluid is an incompressible liquid, the pressure of the pressurized hydraulic fluid functions as resistance to the compressive deformation of the leg portion 35. Thus, when the movable diaphragm 31 is about to be elastically deformed downward on a large scale in the closed condition of the third liquid chamber 50, the spring constant due to the leg portion 35 increases non-linearly, whereby it is possible to make the elastic deformation of the movable diaphragm 31 difficult.

Therefore, when it is set that there is a clearance between the bottom surface 38 and the stopper surface 48 in a neutral position of the bottom surface 38 (the position of the bottom surface 38 in the neutral condition without input of vibration, namely the position shown in FIG. 3), the movable diaphragm 31 is elastically deformed at the weak spring constant due to only its own spring constant until the bottom surface 38 comes in contact with the stopper surface 48 by the vibration input. After that, when the bottom surface 38 comes in contact with the stopper surface 48, the strong spring is created by adding the reaction force due to the elastic deformation of the leg portion 35. Then, the reaction force is more strengthened in proportion to pressurization of the hydraulic fluid in the third liquid chamber 50 and the spring constant is increased further. Consequently, the remarkable and suitable non-linear spring characteristic can be fulfilled.

By the way, the existence or nonexistence of the clearance between the bottom surface 38 and the stopper surface 48 in the neutral position may be freely set. Also, in the case where the clearance is provided, its size may be freely set, and as the clearance increases in size, the time for absorbing the internal pressure by the elastic deformation due to the small spring constant of the movable diaphragm 31 with respect to the small amplitude vibration becomes longer. On the other hand, as the clearance decreases in size, there can be fulfilled the abrupt change in spring constant of the movable diaphragm 31.

Further, when the bottom surface 38 of the leg portion 35 is brought out of contact with the stopper surface 48 by turning to the minus vibration after pressurizing the hydraulic fluid within the third liquid chamber 50 by the plus vibration, the third liquid chamber 50 is opened to the secondary liquid chamber 13, so that the pressurized hydraulic fluid flows out of an annular gap (hereinafter, referred to as an orifice clearance 51; see FIG. 3) which is formed between the bottom surface 38 of the leg portion 35 and the stopper surface 48 to the side of the secondary liquid chamber 13. Therefore, when the opening and closing of the third liquid chamber 50 is repeated, the resonance occurs due to the flow of the hydraulic fluid through the orifice clearance 51. Accordingly, when this resonance frequency is tuned to the idle frequency, it functions as the idle orifice.

The opening and closing of the orifice clearance 51 is extremely important in order to demonstrate the function as the idle orifice. The reason is, the resonance utilizing the flow of the hydraulic fluid from the third liquid chamber 50 does not occur unless the orifice clearance 51 is opened and closed by the vibrations from the large amplitude vibration to the small amplitude vibration or by the large amplitude vibration and the medium amplitude vibration, which are the vibrations under normal conditions, excepting the excessive amplitude vibration which is the input vibration under extraordinary conditions. Such opening and closing conditions can be obtained by adjusting the clearance at the time of the neutral condition, formed in the neutral position between the bottom surface 38 (or a pressing portion 36a, 37a described below) and the pressed portion 60 (or 70 described below) such as the stopper surface 48.

It is also important that the orifice clearance 51 is provided in an annular form throughout the circumference. Since the idle orifice passage needs to allow a large amount of hydraulic fluid to flow at the relatively high frequency in comparison with the damping orifice passage, it is required that the passage is formed as short as possible and has a cross sectional area as large as possible. To meet this condition, the annular passage formed in the full circumference is optimum.

Accordingly, the structure for functioning as the idle orifice passage requires that the orifice clearance 51 is opened and closed by the vibration under the normal conditions, that the orifice clearance 51 is in an annular form, and that the orifice clearance 51 is tuned so as to resonate at the frequency of the idle vibration.

The flow of the hydraulic fluid in the orifice clearance 51 does not necessarily need the opening and closing of the orifice clearance 51. For example, in the case where the clearance between the bottom surface 38 and the stopper surface 48 in the neutral position is made larger so as not to be closed by the small amplitude vibration, the flow occurs such that the hydraulic fluid is pushed into the third liquid chamber 50 by the plus vibration and, when turning to the minus vibration, the hydraulic fluid flows out of the orifice clearance 51 to the side of the secondary liquid chamber 13.

However, in comparison with the case of closing the orifice clearance 51, since the hydraulic fluid within the third liquid chamber 50 is not pressurized so much, the flow of the hydraulic fluid is decreased thereby making it difficult to create the strong resonance.

Therefore, to allow the resonance to be created in the case where the orifice clearance 51 is not closed as above, it is preferable that the orifice clearance 51 at the time of plus vibration is set as small as possible.

Next, the operation of this embodiment will be described with reference to FIGS. 6A, 6B and 6C. FIG. 6 show the left side of the leg portion 35 and its related components on an enlarged scale in the cross sectional view of FIG. 3, wherein FIG. 6A is a neutral position, FIG. 6B being a condition that the plus vibration is inputted, and FIG. 6C is a condition that the minus vibration is inputted.

At first, in the condition that the leg portion 35 is situated in the neutral position as seen in FIG. 6A, when the vibration is inputted from the first mounting member 1 and the internal pressure of the primary liquid chamber 12 fluctuates due to the elastic deformation of the elastic main body 3, the movable diaphragm 31 is elastically deformed so as to absorb the fluctuation. At that time, when the input vibration is the small amplitude vibration, since the leg portion 35 repeats the up and down movement in proportion to the elastic deformation of the movable diaphragm 31 in a non-contact condition between the bottom surface 38 and the stopper surface 48, the movable diaphragm 31 is elastically deformed by its own spring constant to absorb the internal pressure of the primary liquid chamber 12 and decreases in dynamic spring.

Then, when the amplitude of the input vibration grows to a larger medium amplitude vibration, the bottom surface 38 of the leg portion 35 comes in contact with the stopper surface 48, as seen in FIG. 6-B. In the medium amplitude vibration, the bottom surface 38 of the leg portion 35 is pressed against the stopper surface 48 and is compressed and deformed larger as the amplitude of the input vibration is amplified, so that the spring constant of the movable diaphragm 31 is strengthened. At the same time, the orifice clearance 51 vanishes and the third liquid chamber 50 is closed, whereby the hydraulic fluid is tightly confined within the third liquid chamber 50. However, the elastic deformation of the leg portion 35 is not so large that the hydraulic fluid within the third liquid chamber 50 is not pressurized too much.

When turning to the minus vibration, the leg portion 35 moves upward to bring the bottom surface 38 out of contact with the stopper surface 48 so as to form the orifice clearance 51, whereby the third liquid chamber 50 is opened and the confined hydraulic fluid flows out of the orifice clearance 51 to the side of the secondary liquid chamber 13. After that, the leg portion 35 keeps moving further upward and, when having passed the neutral position, the movable diaphragm 31 is elastically deformed in such a way as to move into the primary liquid chamber 12, as seen in FIG. 6C.

In such a vibration inputting condition, when the input vibration is the plus small amplitude vibration, the leg portion 35 is elastically deformed only in such a manner that the seal rib 39 is crushed or that the bottom surface 38 is slightly compressed against the stopper surface 48. Therefore, the movable diaphragm 31 is elastically deformed substantially only by its own spring constant to absorb the internal pressure fluctuation of the primary liquid chamber 12 and decreases in dynamic spring. Then, although the third liquid chamber 50 is sealed by allowing the bottom surface 38 of the leg portion 35 to be pressed on the stopper surface 48, the sealing performance is maintained by the seal rib 39. Moreover, at the time of the small amplitude vibration, there are cases where the seal rib 39 comes in line contact with the stopper surface 48 and the whole bottom surface 38 does not come in contact with the stopper surface 48. Such cases can contribute further to the decrease in dynamic spring.

When the large amplitude vibration is inputted, the elastic deformation of the movable diaphragm 31 becomes larger than when the medium amplitude vibration is inputted, and at the time of the plus vibration as seen in FIG. 6B, the leg portion 35 is elastically deformed large in the compressive direction to pressurize the hydraulic fluid within the third liquid chamber 50. On the other hand, through this pressurization of the hydraulic fluid, the elastic deformation of the leg portion 35 gradually meets with large resistance and approaches the limits of the elastic deformation.

At the time of the minus vibration, the movable diaphragm 31 is elastically deformed larger toward the side of the primary liquid chamber 12, and the clearance between the bottom surface 38 of the leg portion 35 and the stopper surface 48 is expanded large (see FIG. 6C).

At that time, since the hydraulic fluid within the third liquid chamber 50 is sufficiently highly pressurized due to the plus vibration, as soon as, after turning to the minus vibration, the bottom surface 38 of the leg portion 35 is brought out of contact with the stopper surface 48 and the orifice clearance 51 is created, the hydraulic fluid that is pressurized and confined within the third liquid chamber 50 rapidly flows out of the orifice clearance 51 to the side of the secondary liquid chamber 13. This flow is performed all around the annular orifice clearance 51, and a large amount of hydraulic fluid flow occurs around the orifice clearance 51. Accordingly, when the input vibration has a frequency in the idle vibration range, the strong resonance can be created in the orifice clearance 51 by repeating the plus vibration and the minus vibration.

This resonance is tuned in such a way as to occur in the idle vibration range and functions as a second resonance which resonates with the idle vibration of a high frequency range ranking below the first resonance in the damping orifice 14.

Namely, the engine mount in this embodiment is formed of two resonance types which produce the first and second resonance in the dynamic characteristics, and has two high damping or low dynamic spring characteristics due to such two resonance types.

Figure 7A:
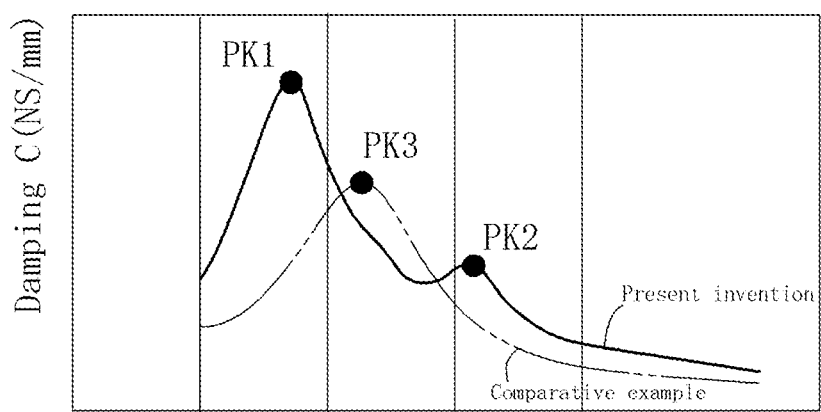
FIGS. 7A and 7B are graphs of a dynamic characteristic of the present invention.
Figure 7B:
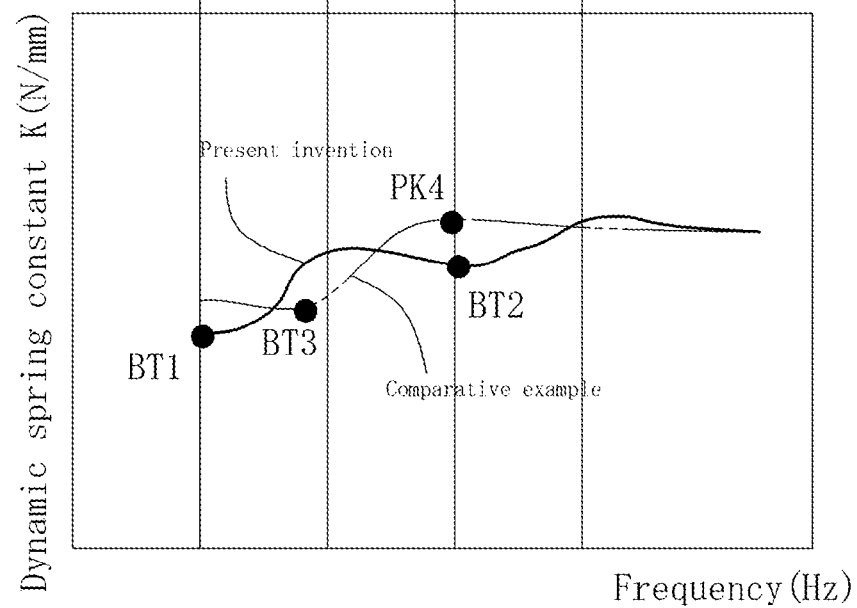

FIG. 7A and FIG. 7B are graphs showing the dynamic characteristic in this engine mount, wherein FIG. 7A shows a damping characteristic chart in which the vertical axis denotes the damping and the horizontal axis denotes the input vibration frequency, and FIG. 7B shows the dynamic spring characteristic chart in which the vertical axis denotes the dynamic spring constant and the horizontal axis denotes the input vibration frequency.

In each drawing, a curve shown by a solid line denotes the characteristic according to the present invention, and a curve shown by a phantom line denotes that of the conventional device as a comparative example that produces only one resonance corresponding to the first resonance of the present invention by only the damping orifice.

As shown in FIG. 7A, the damping characteristic of the present invention produces two peaks (maximal values) on the damping characteristic curve such that a first damping peak PK1 due to the first resonance occurs firstly in the vicinity of 10 Hz and a second damping peak PK2 due to the second resonance occurs secondly in the vicinity of 15 Hz which is a little higher than 10 Hz.

The first damping peak PK1 is due to the first resonance by the damping orifice 14 connecting the primary liquid chamber 12 and the secondary liquid chamber 13 to absorb the large amplitude vibration of low frequency occurring at the time of ordinary traveling or the like. The second damping peak PK2 is formed due to the second resonance created in the orifice clearance 51 connecting the third liquid chamber 50 and the secondary liquid chamber 13 to absorb the idle vibration in the idle vibration range of the vehicle equipped with the three cylinder engine.

The damping operates to suppress the input vibration by the damping force. Therefore, when the vibration of the engine at the time of the idle vibration is inputted, the second resonance suppresses this vibration to control the displacement of the engine. Accordingly, the vibration of the engine decreases whereby the vibration input load relative to the engine mount can be reduced.

Further, as shown in FIG. 7B, the dynamic spring characteristic of the present invention produces two bottoms (minimal values) on the dynamic spring characteristic curve such that a first dynamic spring bottom BT1 due to the first resonance occurs firstly in the vicinity of 5 Hz and a second dynamic spring bottom BT2 due to the second resonance occurs secondly in the vicinity of 15 Hz which is a little higher than 5 Hz.

The dynamic spring bottom can increase a vibration intercepting amount for intercepting the vibration transmission to the vehicle body side by the decrease in dynamic spring. Therefore, it is possible to increase the vibration intercepting amount of the large amplitude vibration of low frequency created at the time of the ordinary traveling by the dynamic spring bottom BT1 of the first resonance, and it is also possible to increase the vibration intercepting amount of the vibration created at the time of the idle vibration by the dynamic spring bottom BT2 of the second resonance. As a result, the riding comfort can be improved.

On the other hand, in the conventional one-resonance type, only a damping peak PK3 (FIG. 7A) in the vicinity of 10 Hz and a dynamic spring bottom BT3 (FIG. 7B) occur due to one resonance corresponding to the first resonance, respectively. Accordingly, only the large amplitude vibration of low frequency created at the time of the ordinary traveling or the like is absorbed by the damping orifice, while the idle vibration can not be absorbed. To absorb this idle vibration, it is required to provide another idle orifice which connects the primary liquid chamber and the secondary liquid chamber and to control the idle orifice in such a manner that it is opened in the idle vibration range and closed in another vibration range by a valve mechanism of an opening and closing type, etc.

Thus, in the engine mount of one resonance type as shown in FIG. 7A and FIG. 7B, the idle vibration can not be absorbed without provision of the idle orifice of the opening and closing type which is complicated in structure and expensive. It is even more impossible to create the second resonance without provision of the idle orifice designed to open and close by the opening and closing type valve mechanism, etc. as the present invention.

Further, as shown in FIG. 7B, in the three cylinder engine, when the dynamic spring bottom BT3 due to the first resonance is set in the ordinary traveling range by the conventional dynamic spring characteristic, a peak PK4 of anti-resonance occurs in the vicinity of 15 Hz located in the idle resonance range, so that there are decreased the absorption capacity and the vibration intercepting amount of the idle vibration. As a result, the vibration of the vehicle body due to the idle vibration becomes conspicuous. Therefore, with respect to the engine mount provided on the three cylinder engine, it is required in particular to absorb the idle vibration with provision of the idle orifice designed to open and close by the opening and closing type valve mechanism, etc.

Since the peak of the anti-resonance due to the first resonance is inclined to shift to the high frequency side with increase in number of cylinder, the absorption of the idle vibration is essential to the engine mount used for the three cylinder engine vehicle.

Contrary to this, in the present invention, the second resonance occurs in the orifice clearance 51 between the third liquid chamber 50 and the secondary liquid chamber 13 in the idle vibration range so as to absorb the idle vibration. In addition, the two resonance can be created by the combination of the conventional damping orifice 14 and the movable diaphragm 31 equipped with the leg portion 35, and the idle vibration can be effectively intercepted. Thus, there is no need for providing the structurally complicated and expensive idle orifice of the opening and closing type, so that the engine mount can be made simple in structure and inexpensive and is suitable especially for the three cylinder engine vehicle.

Furthermore, when the moveable diaphragm 31 is elastically deformed in the Z direction, i.e. the direction of the main vibration, by input of the vibration to the engine mount, the stopper surface 48 which is the portion to be pressed lies at right angles to the direction of the elastic deformation of the movable diaphragm 31, whereby the bottom surface 38 of the leg portion 35 is pressed vertically on the stopper surface 48. Therefore, the bottom surface 38 can come in tight contact with the stopper surface 48 and the third liquid chamber 50 can be more reliably kept in the tight sealing condition.

In addition, the provision of the annular seal rib 39 can improve the sealing performance even if the movable diaphragm 31 is in a comparatively small deformation condition. Accordingly, the increase in spring constant of the movable diaphragm 31 at the time of contact between the seal rib 39 and the stopper surface 48 is controlled, whereby the low dynamic spring and the high sealing performance are compatible with each other.

Moreover, the first resonance of the damping orifice 14 allows the fluctuation of the internal pressure of the primary liquid chamber 12 to be increased at the time of the anti-resonance thereof, upon which the elastic deformation of the movable diaphragm 31 is increased, and when the leg potion 35 and the stopper surface 48 which is the portion to be pressed come in contact with each other, the third liquid chamber 50 is tightly closed. After that, when the third liquid chamber 50 is opened, the hydraulic fluid flows out of the third liquid chamber 50, and the second resonance is created due to this flow of the hydraulic fluid. Thus, the second resonance can be created by utilizing the first resonance of the damping orifice 14.

Next, the second embodiment will be described with reference to FIGS. 8, 9A, 9B, 9C and 9D. This embodiment is different from the first embodiment only with respect to the pressing structure of the leg portion. Accordingly, like elements are given like reference characters, and the description centers around different elements or sections.

Figure 8:
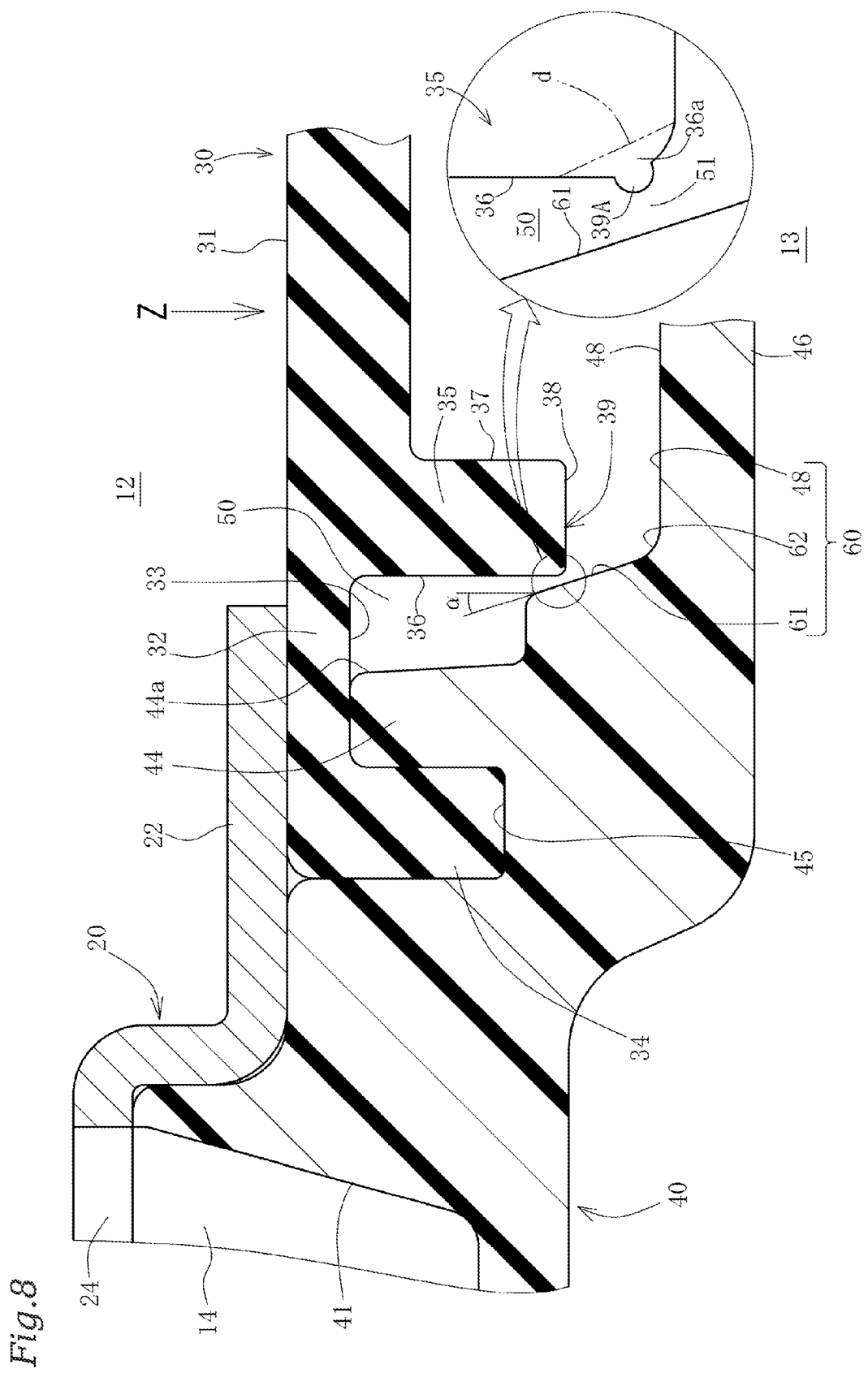
FIG. 8 is a cross sectional view of a region similar to FIG. 6A according to a second embodiment.

FIG. 8 is a cross sectional view of a region corresponding to FIG. 6A of the first embodiment and FIGS. 9A, 9B, 9C and 9D are explanatory views of the operation corresponding to FIGS. 6A, 6B and 6C. Since the structure of the engine mount other than sections shown in these drawings is identical to that of the first embodiment, the overlapping description will be omitted.

In this embodiment, the leg portion 35 is identical to that of the first embodiment, but the outer lateral surface 36 and the bottom surface 38 of the leg portion 35 are configured to be pressed on a pressed portion 60 comprising a support wall inner surface 44a which is an inner circumferential surface of the support wall 44, and the stopper surface 48 of the bottom section 46.

By the way, a lower portion of the outer lateral surface 36 is formed with a pressing portion 36a which is pressed against the side of the support wall inner surface 44a, and the bottom surface 38 is pressed against the stopper surface 48.

On the lower side of the support wall inner surface 44a (secondary liquid chamber 13 side), there is formed a taper surface 61. This taper surface 61 has an inclined surface of a taper shape expanding in a radial direction of the secondary liquid chamber 13 toward the upper primary liquid chamber 12. At the time of the plus vibration, the pressing portion 36a on the outer lateral surface 36 of the leg portion 35 is pressed and slides on the taper surface 61. The taper surface 61 is formed in a portion of the support wall inner surface 44a of the support wall 44 so as to include at least an area on which the pressing portion 36a of the leg portion 35 slides at the time of the plus vibration. The taper surface 61 may be provided not partially but all over the support wall inner surface 44a.

A lower end portion of the taper surface 61 extends downward below a bottom portion of the support groove 45 and is connected through a round shaped portion 62 to the stopper surface 48 which forms the upper surface of the bottom portion 46. The round shaped portion 62 is a curved surface which connects the taper surface 61 and the stopper surface 48 in a round shape (in a circular arc shape), in a cross section as shown in the drawing.

The taper surface 61 and the round shaped portion 62 are curved surfaces which are formed in a circumferential wall shape surrounding the center line of the frame member 40 (which is also the center line CL of the engine mount), respectively.

The pressed portion 60 is comprised of the taper surface 61, the round shaped portion 62 and the stopper surface 48.

The lower side of the taper surface 61 has an inclined surface which inclines downward in the central direction, while the upper side thereof expands in the radial direction toward the primary liquid chamber 12. The taper surface 61 protrudes to the central side of the movable diaphragm 31 with going down the inclination and forms the inclined surface of an angle α relative to the main vibration input direction Z. This angle α may be freely set according to the purpose.

Namely, the taper surface 61 inclines in such a way as to converge at the center with going downward in FIG. 8. In other wards, the support wall 44 has a cylindrical shape, and the support wall inner surface 44*a* forming the inner circumferential surface of the support wall 44 has a certain vertical width that the leg portion 35 can slide in parallel to the main vibration input direction Z.

An inner diameter of a circular space formed by the lower portion of the support wall inner surface 44*a* decreases in diameter with going downward, thereby to form the taper surface 61.

The lower section below the taper surface 61 forms the round shaped portion 62 and the stopper surface 48 connected thereto. The upper surface of the stopper surface 48 has a substantially horizontal flat surface parallel to the lower surface 38 of the leg portion 35 and extends in the central direction to form the upper surface of the bottom portion 46 around the central opening 47.

The pressed portion 60 comprises the taper surface 61, the round shaped portion 62 and the stopper surface 48. When the leg portion 35 in the pressing condition is received by the taper surface 61, the leg portion 35 is compressed by the press reaction force from the taper surface 61 and the compression amount changes. Consequently, when the compression amount increases, the spring constant of the movable diaphragm 31 rises and prevents the free elastic deformation. Thus, there is formed the deformation control section of the movable diaphragm 31.

Incidentally, this deformation control section is functionally differentiated by the displacement amount of the leg portion 35, namely, the amplitude of the input vibration. At the time of the plus vibration, the leg portion 35 moves downward to the side of the secondary liquid chamber 13. At the time of the medium amplitude of vibration, it slides on the taper surface 61, and at the time of the large amplitude of vibration, slides on the round shaped portion 62. Further, at the time of the excessive amplitude of vibration, it comes in contact with the stopper surface 48.

In the neutral position as shown in FIG. 8, the pressing portion 36*a* is not in contact with the taper surface 61, and the orifice clearance 51 comprised of an annular clearance extending around the circumference is formed between the pressing portion 36*a* and the taper surface 61 so as to communicate between the third liquid chamber 50 and the secondary liquid chamber 13. This orifice clearance 51 is opened and closed, and changes its opening area in proportion to the size of the input vibration. When the plus vibration is inputted, the orifice clearance 51 is kept in the open state at the time of the small amplitude vibration, and closed by the vibration of the medium amplitude and above. At the time of the minus vibration, since the movable diaphragm 31 moves upward to the side of the primary liquid chamber 12, the leg portion 35 also moves upward beyond the neutral position, and the orifice clearance 51 is opened larger than the neutral position.

The position of the pressing portion 36*a* in the neutral position is tuned or adjusted not to contact the taper surface 61 when the plus vibration of the small amplitude is inputted. However, it may be freely tuned in such a way as to contact the taper surface 61 in the neutral position or when having inputted the plus vibration of the small amplitude. In this case, a large taper surface extending substantially all over the support wall inner surface 44*a* can be formed. Moreover, in the case where the orifice clearance 51 is set to close in the neutral position, the orifice clearance 51 is formed only at the time of the minus vibration.

The third liquid chamber 50 is formed in an annular shape between the support wall 44 and the leg portion 35 in the same way as the preceding embodiment and extends continuously around the circumference of the elastic partition member 30. This third liquid chamber 50 is closed when the plus vibration of the medium amplitude is inputted and pressing portion 36*a* of the leg portion 35 comes in tight contact with the taper surface 61, whereby the hydraulic fluid is confined within the third liquid chamber 50. At the time of inputting the small amplitude vibration, and in the neutral position, as well as at the time of inputting the minus vibration, the third liquid chamber 50 is opened when the pressing portion 36*a* of the leg portion 35 is brought out of contact with the taper surface 61, whereby it communicates with the secondary liquid chamber 13 and the hydraulic fluid flows between the third liquid chamber 50 and the secondary liquid chamber 13.

On the pressing portion 36*a* of the leg portion 35, a seal rib 39A is integrally provided in such a way as to project outward in the radial direction of the movable diaphragm 31. The seal rib 39A is an annular sealing member which is formed continuously around the circumference along an outer circumferential surface of the lower portion of the leg portion 35. When the pressing portion 36*a* of the leg portion 35 is pressed against the taper surface 61, the seal rib 39A comes in fluid-tight contact with the taper surface 61. Therefore, when the pressing portion 36*a* slides on the taper surface 61, the hydraulic fluid within the third liquid chamber 50 can be surely sealed so as not to leak out to the secondary liquid chamber 13.

Figure 9A:
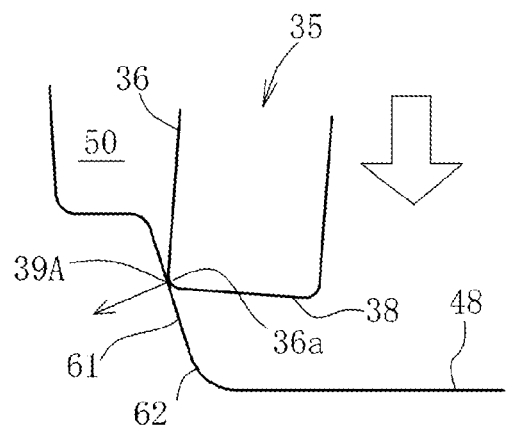
FIGS. 9A, 9B, 9C and 9D are explanatory views of the operation according to the second embodiment.
Figure 9B:
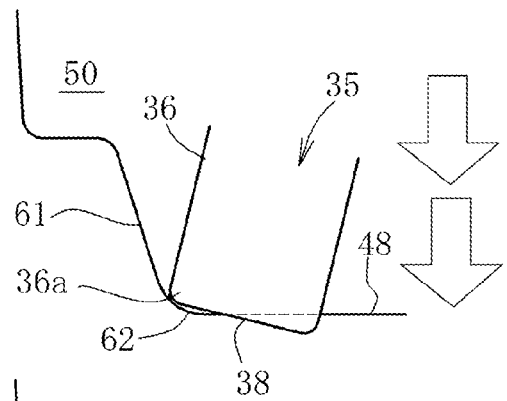
Figure 9C:
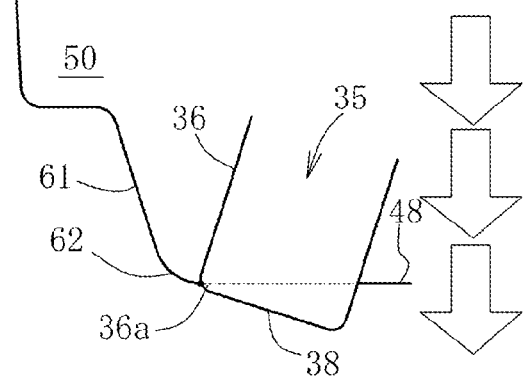
Figure 9D:
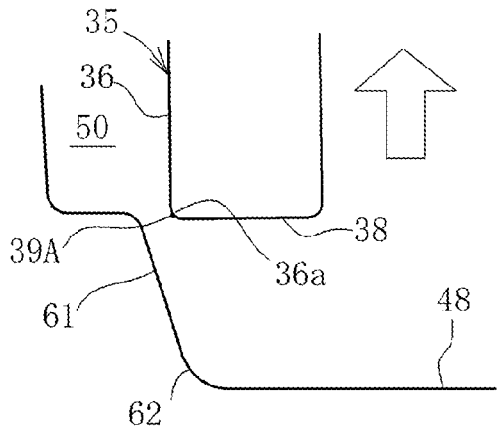

Next, the operation of this embodiment will be described. FIGS. 9A, 9B, 9C and 9D are operation explanatory views for showing the movement of the leg portion 35 theoretically, wherein FIG. 9A is at the time of inputting the medium amplitude vibration, FIG. 9B being at the time of inputting the large amplitude vibration, and FIG. 9C is at the time of inputting the excessive amplitude vibration. These FIGS. 9A, 9B and 9C are conditions in the plus vibration, respectively, and FIG. 9D is at the time of inputting the minus vibration.

First, at the time of having inputted the vibration, in FIG. 8, the internal pressure of the primary liquid chamber 12 fluctuates due to the elastic deformation of the elastic main body 3, and the movable diaphragm 31 is elastically deformed so as to attenuate this fluctuation. Then, in the case where the small amplitude vibration is inputted, the leg portion 35 does not exert an influence on the spring constant of the movable diaphragm 31 since the pressing portion 36*a* is not in contact with the taper surface 61, and the movable diaphragm 31 changes its own spring constant linearly according to the displacement. In addition, the orifice clearance 51 is kept opening. Therefore, the third liquid chamber 50 and the secondary liquid chamber 13 communicate with each other so as to allow the hydraulic fluid to flow freely.

Next, when the medium amplitude vibration is inputted, the outer lateral surface 36 of the leg portion 35 comes at the lower pressing portion 36*a* thereof in contact with the taper surface 61, in the plus vibration as shown in FIG. 9-A. At the same time, the orifice clearance 51 formed between the pressing portion 36*a* and the taper surface 61 is closed thereby to confine the hydraulic fluid in the third liquid chamber 50. Then, since the seal rib 39A is provided on the pressing portion 36*a*, the hydraulic fluid can be kept fluid-tightly within the third liquid chamber 50.

In addition, since the movable diaphragm 31 is elastically deformed downward larger with approaching the center portion, the leg portion 35 located in the outer circumferential section inclines in such a way as to open the pressing portion 36a outward in the radial direction, whereby the pressing portion 36a is pressed against the taper surface 61 in the substantially vertical direction. Therefore, the reaction force due to the press of the leg portion 35 to be directed from the taper surface 61 to the movable diaphragm 31 can be increased. Also, since the tight contact of the pressing portion 36a with the taper surface 61 is strengthened, the seal relative to the third liquid chamber 50 is given more reliably.

In this condition, the pressing portion 36a slides up and down on the taper surface 61, and moves downward with increase in the amplitude of the plus vibration. On the other hand, since the taper surface 61 is formed in the taper shape the lower portion of which narrows inward in the radial direction, the pressing portion 36a is pressed more strongly thereto whereby to increase the compression amount of the leg portion 35. Consequently, since the spring constant of the movable diaphragm 31 increases linearly as the leg portion 35 moves downward, thereby making the elastic deformation difficult, the absorption of the internal pressure of the primary liquid chamber 12 is decreased so as to feed the larger amount of hydraulic fluid into the damping orifice 14, so that the resonance efficiency in the damping orifice 14 is heightened, thereby making it possible to increase the damping force created due to the resonance.

When the amplitude of the input vibration grows larger to the large amplitude, the pressing portion 36a moves from the taper surface 61 downward to the round shaped portion 62. In the round shaped portion 62, since the sliding surface is formed into a round curve surface so as to allow the leg portion 35 to be compressed larger and rapidly, the spring constant of the movable diaphragm 31 increases more non-linearly relative to the displacement amount at the lower area. Consequently, the spring constant of the movable diaphragm 31 increases sufficiently whereby to feed the still larger amount of hydraulic fluid within the primary liquid chamber 12 into the damping orifice 14, so that the resonance efficiency is more heightened thereby allowing the higher damping to be fulfilled.

Incidentally, although, in FIG. 9B, the lower part of the leg portion 35 is shown in a partly overlapping condition with the stopper surface 48, a portion of the leg portion 35 projecting below the stopper surface 48 is a non-existent portion to be compressed and deformed, and actually, this portion is crushed above the stopper surface 48 (the same goes for FIG. 9C).

When the input vibration grows to the excessive vibration as shown in FIG. 9-C, the pressing portion 36a moves close to the lower end of the round shaped portion 62. Since such input vibration arises not under ordinary conditions any longer but under extraordinary conditions, it is necessary to stop the elastic deformation of the movable diaphragm 31. Then, not only the outer lateral surface 36 but also the bottom surface 38 of the leg portion 35 are pressed against the stopper surface 48 so as to stop the downward movement of the leg portion 35.

At that time, since the stopper surface 48 catches the bottom surface 38 of the leg portion 35 in the substantially vertical direction, it can surely stop the downward movement of the leg portion 35. At the same time, since the compression amount of the leg portion 35 is maximized thereby to make the spring constant of the movable diaphragm 31 largest, it is possible to prevent the excessive downward elastic deformation of the movable diaphragm 31.

Further, in each of FIG. 9A, FIG. 9B and FIG. 9C, the hydraulic fluid confined in the third liquid chamber 50 at the time of the plus vibration is pressurized more strongly in proportion to the downward movement of the leg portion 35. At that time, due to the seal by the tight contact of the seal rib 39A and due to the tight contact of the crushed portion of the pressing portion 36a in the case where the compressive deformation of the pressing portion 36a has increased, the high sealing performance can be maintained.

FIG. 9-D shows the condition that the input vibration is reversed to the minus vibration. In this condition, the movable diaphragm 31 is elastically deformed to the side of the primary liquid chamber 12 and simultaneously with this deformation the leg portion 35 moves upward. Therefore, the bottom surface 38 of the leg portion 35 moves upward above the neutral position, and the pressing portion 36a is brought out of contact with the taper surface 61, whereby the orifice clearance 51 is opened and its opening degree is expanded.

This embodiment can create the second resonance by the movement of the leg portion 35 in the similar way as the previous embodiment besides changing the spring constant of such movable diaphragm 31 non-linearly. For example, in FIG. 9A, the input vibration allows the leg portion 35 to move up and down, and by the plus vibration, the hydraulic fluid is confined and pressurized in the third liquid chamber 50, while by the minus vibration, the pressing portion 36a of the leg portion 35 is brought out of contact with the taper portion 61 to form the orifice clearance 51, whereby the third liquid chamber 50 is opened to the secondary liquid chamber 13. Therefore, the hydraulic fluid kept within the third liquid chamber 50 flows from the orifice clearance 51 to the secondary liquid chamber 13.

Accordingly, when the plus vibration and the minus vibration are repeated, the flow of the hydraulic fluid is created in the orifice clearance 51. When the frequency of the input vibration turns to the idle vibration range, the resonation occurs thereby allowing the second resonance to be produced. The effect of the second resonance is the same as the previous embodiment. In this embodiment, however, the compression amount of the leg portion 35 changes tremendously non-linearly in proportion to the movement amount of the leg portion 35, so that the hydraulic fluid within the third liquid chamber 50 can be pressurized more strongly, thereby making the resonance effect larger.

Further, the pressurized hydraulic fluid can be reliably sealed by the annular seal rib 39A formed on the pressing portion 36a.

In addition, since, when the leg portion 35 comes in contact with the taper surface 61 of the pressed portion 60, the annular seal rib 39A comes in line contact with and slide on the taper surface 61 in such a condition that the movable diaphragm 31 is deformed in a comparatively small extent, the rise in spring constant of the movable diaphragm 31 is controlled, so that the dynamic spring can be made comparatively low as the high sealing performance is maintained, thus making the low dynamic spring consistent with the high sealing performance.

Moreover, the outer lateral surface 36 which is the lowest part in rigidity of the leg portion 35 serves as a contact portion with the taper surface 61 and the round shaped portion 62 of the pressed portion 60. Therefore, in comparison with the case of allowing another part to contact the pressed portion 60, the increase in spring constant of the movable diaphragm 31 is controlled whereby the comparatively low dynamic spring can be fulfilled.

Also, since the taper surface 61 is inclined in such a way as to radially expand towards the side of the primary liquid chamber 12, the contact amount of the leg portion 35 against the taper surface 61 changes non-linearly in proportion to the size of the input vibration, so that the spring constant of the movable diaphragm 31 can be changed non-linearly. At the same time, the third liquid chamber 50 is turned to the sealed space, and the hydraulic fluid within the third liquid chamber 50 can be pressurized and increased in internal pressure.

Furthermore, as shown by a phantom line d in FIG. 8, if the side of the pressing portion 36a of the leg portion 35 is formed with a taper surface which narrows in the radial direction toward the side of the secondary liquid chamber 13, it is possible to increase the contact amount of the leg portion 35 relative to the taper surface 61 and the round shaped portion 62 of the pressed portion 60. Therefore, when the movable diaphragm 31 is elastically deformed by the vibration input to the engine mount, the contact amount of the leg portion 35 relative to the pressed portion side can be changed non-linearly, thereby allowing the spring constant of the movable diaphragm 31 to be changed non-linearly.

Consequently, at the time of the large deformation of the movable diaphragm 31, the deformation control of the movable diaphragm 31 is enhanced so as to increase the amount of the hydraulic fluid which flows into the damping orifice 14, whereby to allow the first resonance of the large resonance efficiency to be created in the damping orifice 14, while, at the time of small deformation, the influence exerted upon the spring constant of the movable diaphragm 31 by contact between the leg portion 35 and the pressed portion side is diminished so as to control the increase in the spring constant of the movable diaphragm 31 whereby to allow the decrease in dynamic spring to be fulfilled.

Next, the third embodiment will be described with reference to FIGS. 10, 11A, 11B, 11C and 11D. This embodiment differs from the second embodiment in that the leg portion is provided not on the outer lateral surface but on the inner lateral surface and that the pressed portion is provided on the inside of the leg portion. Other elements or sections are identical, and the description centers around the different elements or sections from the second embodiment.

Figure 10:
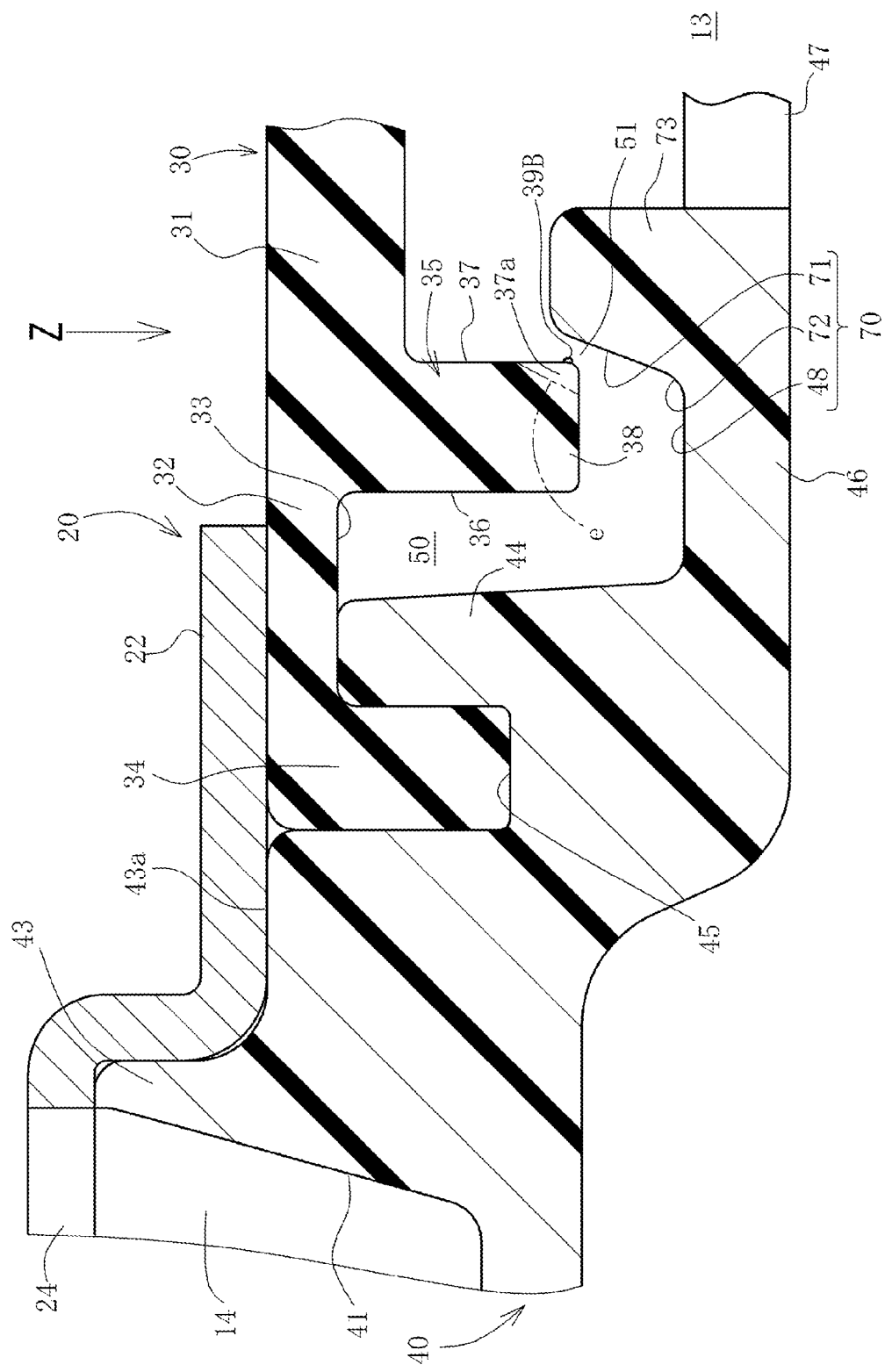
FIG. 10 is a cross sectional view of a region similar to FIG. 8 according to a third embodiment.

FIG. 10 is a cross sectional view of a region corresponding to FIG. 8 of the second embodiment and FIGS. 11A, 11B, 11C and 11D are explanatory views of the operation respectively corresponding to FIGS. 9A, 9B, 9C and 9D. Since the structure of the engine mount other than sections shown in these drawings is identical to that of the first and second embodiments.

In this embodiment, the leg portion 35 is identical to that of the first embodiment, but the inner lateral surface 37 and the bottom surface 38 are configured to be pressed on a pressed portion 70 which is formed on the inside of the leg portion 35.

The pressed portion 70 is comprised of a taper surface 71, a round shaped portion 72 and the stopper surface 48. The taper surface 71 and the round shaped portion 72 are formed on an outer circumferential surface side of a pressing annular wall 73 which is formed on the inside of the leg portion 35. The pressing annular wall 73 is integrally formed on the bottom portion 46 in such a way as to project upward from the bottom portion 46. The pressing annular wall 73 is concentric with the leg portion 35 and has a circumferential wall shape of a smaller diameter than the leg portion 35. An inner circumferential surface of the pressing annular wall 73 faces the central opening 47.

In FIG. 10 showing the neutral position of the leg portion 35, the pressing annular wall 73 has such a height that it overlaps a little at the upper end thereof with the bottom surface 38 of the leg portion 35. The taper surface 71 is formed on the outer circumferential surface of the pressing annular wall 73. The taper surface 71 is a taper shaped inclined surface extending in the radial direction of the secondary liquid chamber 13 toward the side of the secondary liquid chamber 13 so as to get larger with going downward, and forms a portion on which a pressing portion 37a of an inner lateral surface 37 of the leg portion 35 is pressed and slides at the time of the plus vibration. This taper surface 71 is formed such that it occupies at least an area on which the pressing portion 37a of the leg portion 35 slides at the time of plus vibration.

A lower end portion of the taper surface 71 is connected through a round shaped portion 72 to the stopper surface 48 which forms the upper surface of the bottom portion 46. The round shaped portion 72 is a curved surface which connects the taper surface 71 and the stopper surface 48 in a round shape, in a cross section as shown in the drawing.

The taper surface 71 and the round shaped portion 72 are curved surfaces which are formed in a circumferential wall shape surrounding the center line CL of the frame member 40, respectively.

The taper surface 71 has such an inclined surface that the upper side thereof narrows in the central direction toward the primary liquid chamber 12. The taper surface 71 protrudes to the outer circumferential side of the movable diaphragm 31 with going downward and forms the inclined surface of a predetermined angle relative to the main vibration input direction Z. This inclination angle may be freely set according to the purpose.

Namely, the taper surface 71 inclines in such a way as to expand outward in the radial direction with going downward in FIG. 10. The pressing portion 37a is located above the taper surface 71, whereby, when moving downward, the pressing portion 37a comes in contact with the taper surface 71.

The lower section below the taper surface 71 forms the round shaped portion 72 and the stopper surface 48 connected thereto. The stopper surface 48 is located on the outer circumferential side of the round shaped portion 72 and below the bottom surface 38.

The function of the pressed portion 70 comprising the stopper surface 48, the taper surface 71 and the round shaped portion 72 is the same as that of the previous embodiment, and there is only a difference in that the pressing portion 37a provided on the inner lateral surface 37 of the leg portion 35 slides on the pressed portion.

In the neutral position as shown in FIG. 10, the pressing portion 37a is not in contact with the taper surface 71, and the orifice clearance 51 which is an annular clearance extending around the circumference is formed between the pressing portion 37a and the taper surface 71 so as to communicate between the third liquid chamber 50 and the secondary liquid chamber 13. This orifice clearance 51 is opened and closed, and changes its opening area in proportion to the size of the input vibration. When the plus vibration is inputted, the orifice clearance 51 is kept in the open state at the time of the small amplitude vibration, and closed by the vibration of the medium amplitude and above, in a similar way as the previous embodiment.

The third liquid chamber 50 in this embodiment, extends not only between the support wall 44 and the outer lateral surface 36 of the leg portion 35 but also between the bottom surface 35 of the leg portion 35 and the stopper surface 48 at the time of the vibration of other amplitudes than the large amplitude and the excessive amplitude.

By the way, with respect to the leg portion 35, the lower portion of the inner lateral surface 37 on which the pressing portion 37a is provided, may be formed in an inclined surface shape extending substantially parallel to the stopper surface 48, as shown by a phantom line e in the drawing, so as to slide in surface contact with the taper surface 71.

On the pressing portion 37a of the leg portion 35, a seal rib 39B is integrally provided in such a way as to project inward in the radial direction of the movable diaphragm 31. The seal rib 39B is an annular sealing member which is formed continuously around the circumference along an inner circumferential surface of the lower portion of the leg portion 35. When the pressing portion 37a of the leg portion 35 is pressed against the taper surface 71, the seal rib 39B comes in fluid-tight contact with the taper surface 71. Therefore, when the pressing portion 37a slides on the taper surface 71, that is performed by line contact, and the hydraulic fluid within the third liquid chamber 50 can be surely sealed so as not to leak out to the secondary liquid chamber 13.

Figure 11A:
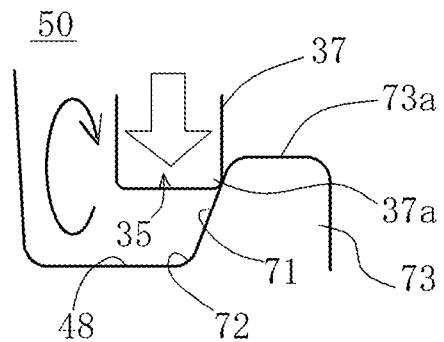
FIGS. 11A, 11B, 11C and 11D are explanatory views of the operation according to the third embodiment.
Figure 11B:
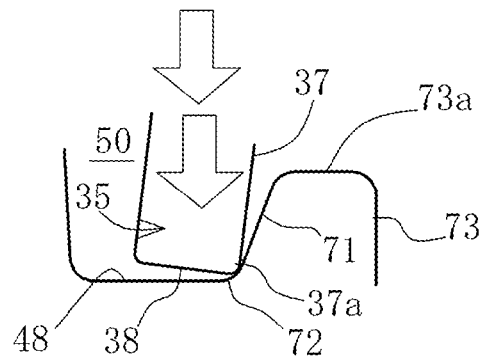
Figure 11C:
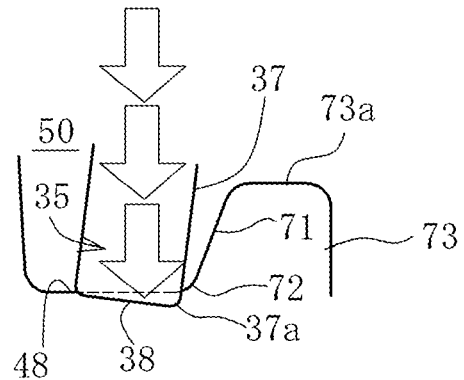
Figure 11D:
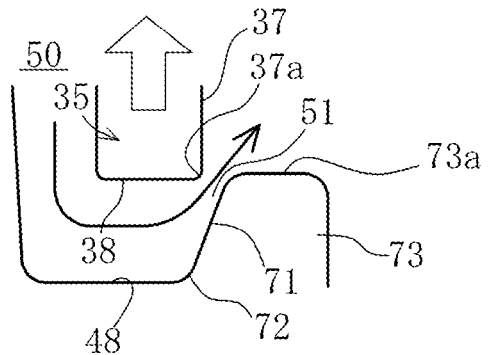

Next, the operation of this embodiment will be described. FIGS. 11A, 11B, 11C and 11D are operation explanatory views for showing the movement of the leg portion 35 theoretically, wherein FIG. 11A is at the time of inputting the medium amplitude vibration, FIG. 11B being at the time of inputting the large amplitude vibration, and FIG. 11C is at the time of inputting the excessive amplitude vibration. These FIGS. 11A, 11B and 11C are conditions in the plus vibration, respectively, and FIG. 11D is at the time of inputting the minus vibration.

First, at the time of having inputted the small amplitude vibration, in a similar manner as the previous embodiment, the leg portion 35 is kept out of contact with the pressed portion 70, and the movable diaphragm 31 changes its own spring constant linearly in proportion to the displacement. In addition, the orifice clearance 51 is kept open.

Next, when the medium amplitude vibration is inputted, in the plus vibration as shown in FIG. 11A, the inner lateral surface 37 of the leg portion 35 comes at the lower pressing portion 37a thereof in contact with the taper surface 71 and slides on the taper surface 71 in the upward and downward direction. At the same time, the orifice clearance 51 is closed thereby to confine the hydraulic fluid in the third liquid chamber 50.

At the time of the plus vibration of the large amplitude, the pressing portion 37a moves from the taper surface 71 downward to the round shaped portion 72 so as to allow the leg portion 35 to be compressed larger and rapidly.

When the input vibration grows to the excessive vibration as shown in FIG. 11-C, the pressing portion 37a moves close to the lower end of the round shaped portion 72 to press the bottom surface 38 against the stopper surface 48 whereby to stop the downward movement of the leg portion 35.

As shown in FIG. 11-D, when the input vibration is reversed to the minus vibration, the movable diaphragm 31 is elastically deformed to the side of the primary liquid chamber 12 and simultaneously with this deformation the leg portion 35 moves upward. Therefore, the bottom surface 38 of the leg portion 35 is located upward above the neutral position, and the pressing portion 37a is brought out of contact with the taper surface 71, so that the orifice clearance 51 is opened and its opening degree is increased.

Upon movement of the pressing portion 37a, the spring constant of the moveable diaphragm 31 is changed non-linearly by changing the compression amount of the leg portion 35 non-linearly, whereby to make the first resonance of the damping orifice 14 more efficient to fulfill the high damping. Then, upon movement of the leg portion 35 between the third liquid chamber 50 and the secondary liquid chamber 13, the second resonance is created due to the opening and closing of the orifice clearance 51 whereby to fulfill the low dynamic spring and the high damping in the idle vibration range. These effects are achieved in a similar manner as the previous embodiment.

According to this embodiment, in addition to the above effects, the still higher damping can be fulfilled. Namely, the leg portion 35 has such a shape as to project downward continuously from the movable diaphragm 31, and the root portion connecting with the movable diaphragm 31 forms the highest portion in rigidity. In addition, the inner lateral surface 37 connected with a thicker wall section of the movable diaphragm 31 and having a short span between the bottom surface 38 and the bottom surface of the movable diaphragm 31 is highest in rigidity in comparison with the outer lateral surface 36 connected with the outer circumferential section 32 which is thin-walled for facilitating the elastic deformation.

Accordingly, since the pressing portion 37a is provided on this inner lateral surface 37, the elastic deformation of the leg portion 35 when sliding on the pressed portion 70 becomes smaller so as to heighten the spring constant of the movable diaphragm 31, so that the amount of the hydraulic fluid fed into the damping orifice 14 is increased, thereby making it possible to fulfill the high damping.

Moreover, there is provided the annular seal rib 39B, and, when the leg portion 35 comes in contact with the taper surface 71 of the pressed portion 70, the annular seal rib 39B comes in line contact with and slide on the taper surface 71 in such a condition that the movable diaphragm 31 is deformed in a comparatively small extent. Therefore, the rise in spring constant of the movable diaphragm 31 is controlled, so that the dynamic spring can be made comparatively low as the high sealing performance is maintained, thus making the low dynamic spring consistent with the high sealing performance.

Further, as shown by a phantom line e in FIG. 10, if the pressing portion 37a of the leg portion 35 is formed with a taper surface which extends in the radial direction toward the side of the secondary liquid chamber 13, it is possible to increase non-linearly the contact amount of the leg portion 35 relative to the taper surface 71 and the round shaped portion 72 of the pressed portion 70. Therefore, when the movable diaphragm 31 is elastically deformed by the vibration input to the engine mount, the contact amount of the leg portion 35 relative to the pressed portion side can be changed non-linearly, thereby allowing the spring constant of the movable diaphragm 31 to be changed non-linearly.

Consequently, at the time of the large deformation of the movable diaphragm 31, the deformation control of the movable diaphragm 31 is enhanced so as to increase the amount of the hydraulic fluid which flows into the damping orifice 14, whereby to allow the first resonance of the large resonance efficiency to be created in the damping orifice 14, while, at the time of small deformation, the influence exerted upon the spring constant of the movable diaphragm 31 by contact between the leg portion 35 and the pressed portion side is diminished so as to control the increase in the spring constant of the movable diaphragm 31, whereby to allow the decrease in dynamic spring to be fulfilled.

Furthermore, since the pressing annular wall 73 is arranged on the inside of the leg portion 35, a top portion 73a (see FIGS. 11A, 11B, 11C and 11D) of the pressing annular wall 73 is positioned in the vicinity of a base portion of the inner lateral wall 37 at the outer circumferential section of the movable diaphragm 31. Accordingly, if the top portion 73a is brought into contact with the outer circumferential section of the movable diaphragm 31 at the time of the large amplitude vibration, etc., the spring constant of the movable diaphragm 31 can be changed larger, and the movement of the movable diaphragm 31 can be controlled strongly.

Figure 13:
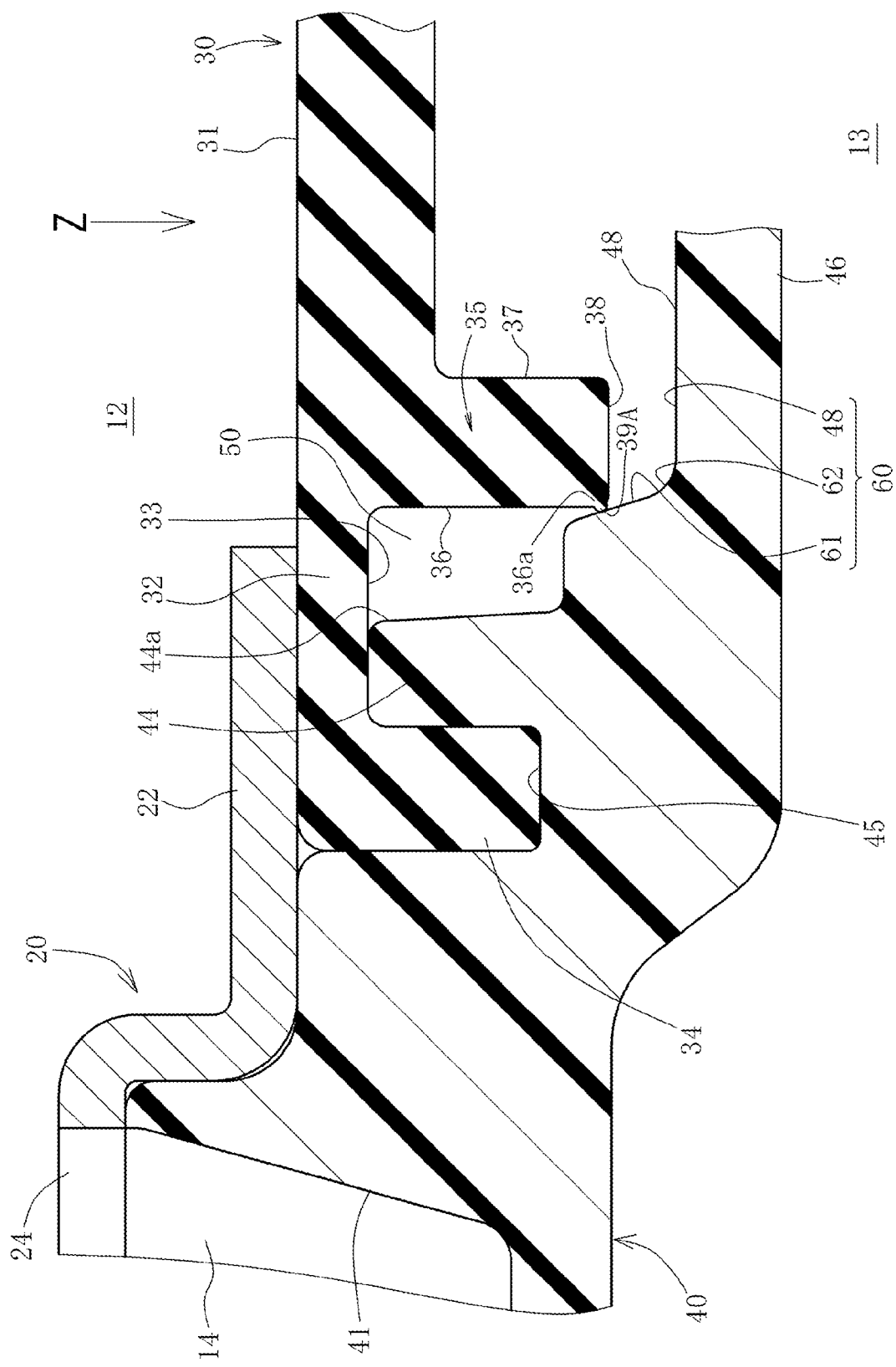
FIG. 13 is a cross sectional view of a region similar to FIG. 8 according to a fifth embodiment.
Figure 14:
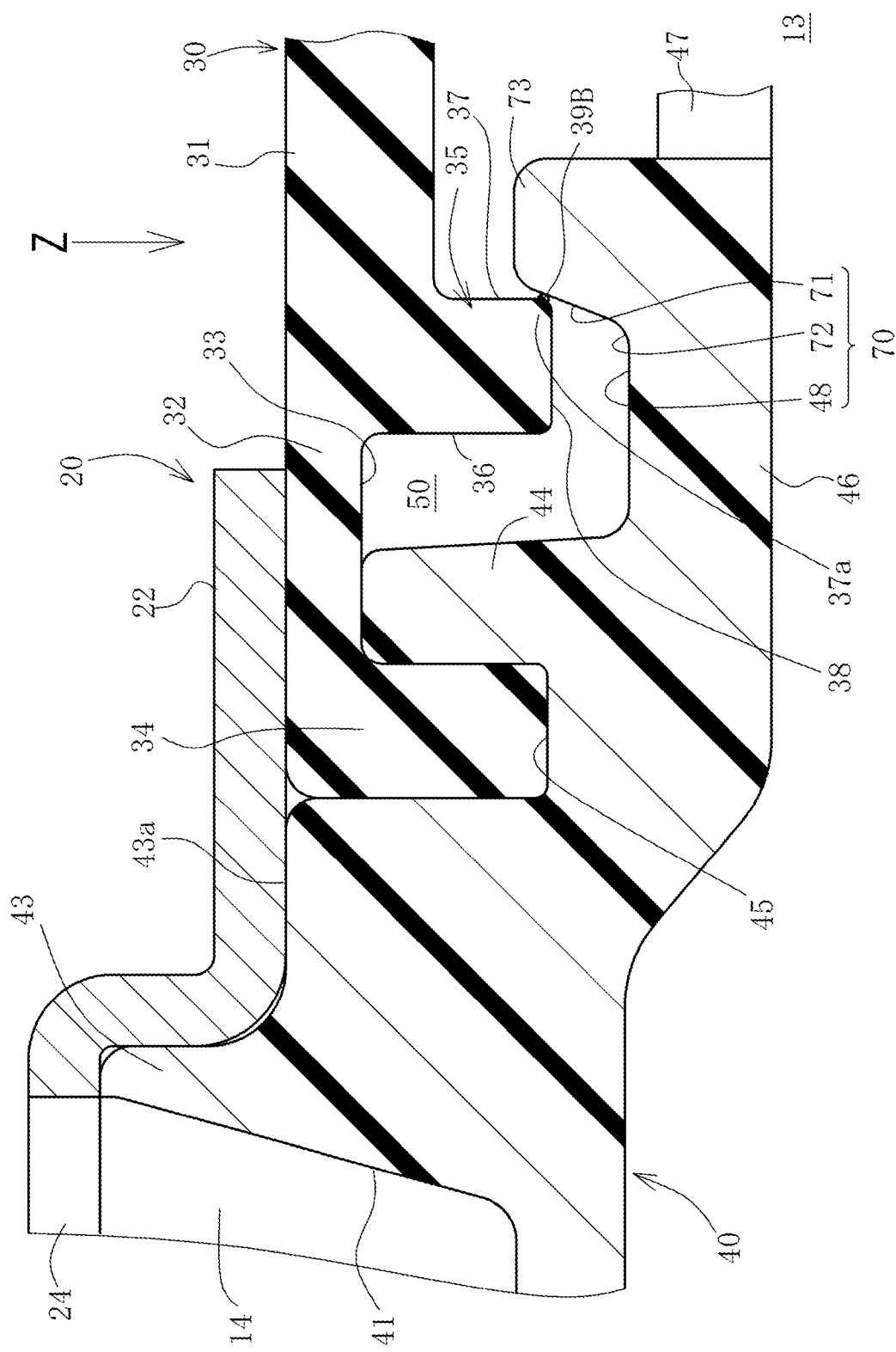
FIG. 14 is a cross sectional view of a region similar to FIG. 10 according to a sixth embodiment.

FIGS. 12 to 14 show a fourth to sixth embodiments in which the leg portion 35 comes in contact with the pressed portion 60 or 70 in the neutral position so as to close the third liquid chamber 50.

FIG. 12 is the fourth embodiment which is a modified form of the first embodiment, showing such a condition that the bottom surface 38 comes in contact with the stopper surface 48 in the neutral position. In this condition, the whole bottom surface 38 does not contact the stopper surface 48 and only the seal rib 39 contacts it. When the leg portion 35 moves downward by inputting the small amplitude vibration in this condition, first the seal rib 39 is crushed, and thereafter, the whole bottom surface 38 contacts the stopper surface 48 and is elastically deformed a little by compression. Therefore, since from the time of the neutral position to an initial stage of inputting the small amplitude vibration, only the seal rib 39 comes in line contact with the stopper surface 48 in comparison with the condition that the whole bottom surface 38 comes in surface contact therewith, the sealing performance of the third liquid chamber 50 is maintained by the seal rib 39, and the influence of the leg portion 35 on the spring of the movable diaphragm 31 is diminished thereby to contribute to the decrease in dynamic spring.

When the whole bottom surface 38 comes in contact with the stopper surface 48, then, the compression amount of the leg portion 35 is increased in proportion as the increase in amplitude, whereby the spring constant of the movable diaphragm 31 is increased non-linearly.

Like this, when the bottom surface 38 comes in contact with the stopper surface 48 in the neutral position, the second resonance can be created due to the small amplitude vibration.

FIG. 13 is the fifth embodiment which is a modified form of the second embodiment, showing such a condition that the pressing portion 36a of the outer lateral surface 36 comes in contact with the stopper surface 61 in the neutral position. In this condition, a large area of the pressing portion 36a does not contact the taper surface 61 and only the seal rib 39A contacts it. When the leg portion 35 moves downward by inputting the small amplitude vibration in this condition, first the seal rib 39A is crushed, and thereafter, the pressing portion 36a contacts the taper surface 61 in a larger area than the seal rib 39A and is elastically deformed a little by compression.

Therefore, since from the time of the neutral position to the initial stage of inputting the small amplitude vibration, only the annular seal rib 39A comes in line contact with the taper surface 61 in comparison with the condition that the pressing portion 36a comes extensively in surface contact therewith, the sealing performance of the third liquid chamber 50 is maintained by the seal rib 39A, and the influence of the leg portion 35 on the spring of the movable diaphragm 31 is diminished thereby to contribute to the decrease in dynamic spring.

In the initial stage of the small amplitude vibration, the seal rib 39A is not crushed and slides on the taper surface 61 in a line contact condition. When the seal rib 39A is crushed due to the increase in amplitude, the pressing portion 36a comes in contact with the taper surface 61 in a larger area. Then, the compression amount of the leg portion 35 is increased in proportion as the increase in amplitude, whereby the spring constant of the movable diaphragm 31 is increased non-linearly.

In this embodiment, the second resonance can also be created due to the small amplitude vibration by sealing the third liquid chamber 50 at the time of the neutral position.

FIG. 14 is the sixth embodiment which is a modified form of the third embodiment, showing such a condition that the pressing portion 37a of the inner lateral surface 37 comes in contact with the taper surface 71 in the neutral position. In this condition, the pressing portion 37a does not come in contact with the taper surface 71 in a large area, and only the seal rib 39B comes in contact therewith. When the leg portion 35 moves downward by inputting the small amplitude vibration in this condition, first the seal rib 39B is crushed, and thereafter, the pressing portion 37a contacts the taper surface 61 in a larger area than the seal rib 39B and is elastically deformed a little by compression.

Therefore, since from the time of the neutral position to the initial stage of inputting the small amplitude vibration, only the annular seal rib 39B comes in line contact with the taper surface 71 in comparison with the condition that the pressing portion 37a comes extensively in surface contact therewith, the sealing performance of the third liquid chamber 50 is maintained by the seal rib 39B, and the influence of the leg portion 35 on the spring of the movable diaphragm 31 is diminished thereby to contribute to the decrease in dynamic spring.

In the initial stage of the small amplitude vibration, the seal rib 39B is not crushed and slides on the taper surface 71 in a line contact condition. When the seal rib 39B is crushed due to the increase in amplitude, the pressing portion 37a comes in contact with the taper surface 71 in a larger area. Then, the compression amount of the leg portion 35 is increased in proportion as the increase in amplitude, whereby the spring constant of the movable diaphragm 31 is increased non-linearly.

In this embodiment, the second resonance can also be created due to the small amplitude vibration by sealing the third liquid chamber 50 at the time of the neutral position.

The present invention is not limited to each of the above embodiments, and various changes and modifications are possible. For example, the present invention is applicable to every kind of liquid sealed vibration isolating device for the vehicle or other apparatus than the vehicle, such as a suspension mount, etc. as well as the engine mount.

What is claimed is:

1. A liquid sealed vibration isolating device comprising a first mounting means being mounted on the vibration source side, a second mounting means being mounted on the vibration transmission side, an elastic main body being provided between the first and second mounting members, a liquid chamber forming a portion of its wall with the elastic main body, a partition member for partitioning the liquid chamber into a primary liquid chamber and a secondary liquid chamber, a damping orifice communicating between the primary liquid chamber and the secondary liquid chamber and producing a first resonance by a predetermined low frequency vibration, a movable diaphragm being provided on at least a portion of the partition member and elastically deformable to absorb a change in internal pressure of the primary liquid chamber, and a leg portion integrally projecting from an outer circumferential portion on the secondary liquid chamber side of the movable diaphragm and being pressed against a pressed portion formed on a portion of a frame member which is provided for fixing a circumference of the partition member, wherein a third liquid chamber is provided between the leg portion and the frame member, and an openable and closable orifice clearance that communicates with the third liquid chamber, is formed between the leg portion and the pressed portion, wherein the orifice clearance is closed when the leg portion comes in contact with the pressed portion, to close up the third liquid chamber tightly, while it is opened when the leg portion is brought out of contact with the pressed portion, to open the third liquid chamber, and wherein a second resonance which resonates at a different frequency from the first resonance produced by the damping orifice is created in the orifice clearance due to the flow of a hydraulic fluid by the opening and closing of the third liquid chamber.

2. The liquid sealed vibration isolating device according to claim 1, wherein the liquid sealed vibration isolating device is formed as an engine mount, and the second resonance resonates in an idle vibration range.

3. The liquid sealed vibration isolating device according to claim 2, wherein a part of the leg portion that comes in contact with the pressed portion is an outer lateral surface of the leg portion.

4. The liquid sealed vibration isolating device according to claim 3, wherein a surface of the pressed portion to come in contact with the leg portion includes a taper surface which is expanded in a radial direction on the side of the primary liquid chamber.

5. The liquid sealed vibration isolating device according to claim 3, wherein the part of the leg portion that comes in contact with the pressed portion is provided with a taper surface that is narrowed in a radial direction on the side of the secondary liquid chamber.

6. The liquid sealed vibration isolating device according to claim 2, wherein a part of the leg portion that comes in contact with the pressed portion is a lower surface of the leg portion located closest to the secondary liquid chamber in an input direction of a main vibration and comes vertically in contact with a surface that lies at right angles to the input direction of the main vibration.

7. The liquid sealed vibration isolating device according to claim 2, wherein a part of the leg portion that comes in contact with the pressed portion is an inner lateral surface of the leg portion.

8. The liquid sealed vibration isolating device according to claim 1, wherein a part of the leg portion that comes in contact with the pressed portion is an outer lateral surface of the leg portion.

9. The liquid sealed vibration isolating device according to claim 8, wherein a surface of the pressed portion to come in contact with the leg portion includes a taper surface which is expanded in a radial direction on the side of the primary liquid chamber.

10. The liquid sealed vibration isolating device according to claim 9, wherein the pressed portion is provided with a round shaped portion continuously connected to the taper surface and serving to control deformation of the leg portion.

11. The liquid sealed vibration isolating device according to claim 9, wherein the part of the leg portion that comes in contact with the pressed portion is provided with a taper surface that is narrowed in a radial direction on the side of the secondary liquid chamber.

12. The liquid sealed vibration isolating device according to claim 8, wherein the part of the leg portion that comes in contact with the pressed portion is provided with a taper surface that is narrowed in a radial direction on the side of the secondary liquid chamber.

13. The liquid sealed vibration isolating device according to claim 1, wherein a part of the leg which portion that comes in contact with the pressed portion is an inner lateral surface of the leg portion.

14. The liquid sealed vibration isolating device according to claim 13, wherein a surface of the pressed portion to come in contact with the leg portion includes a taper surface that is narrowed in a radial direction on the side of the primary liquid chamber.

15. The liquid sealed vibration isolating device according to claim 13, wherein the part of the leg portion to come in contact with the pressed portion is provided with a taper surface that is expanded in a radial direction on the side of the secondary liquid chamber.

16. The liquid sealed vibration isolating device according to claim 1, wherein, in a neutral condition in which vibration is not inputted to the primary liquid chamber, the leg portion comes in contact with the pressed portion to close the third liquid chamber.

17. The liquid sealed vibration isolating device according to claim 16, wherein, when the primary liquid chamber is converted from a plus vibration that the internal pressure rises, to a minus vibration that the internal pressure drops, the leg portion is brought out of contact with the pressed to open the third liquid through the orifice clearance.

18. The liquid sealed vibration isolating device according to claim 1, wherein a part of the leg portion that comes in contact with the pressed portion is a lower surface of the leg portion located closest to the secondary liquid chamber in an input direction of a main vibration and comes vertically in contact with a surface that lies at right angles to the input direction of the main vibration.

19. The liquid sealed vibration isolating device according to claim 1, wherein an annular projection that comes in contact with the pressed portion is integrally formed on the surface of the leg portion.

20. The liquid sealed vibration isolating device according to claim 1, wherein, when the orifice clearance is created between the leg portion and the pressed portion by a rise in internal pressure in the closed condition of the third liquid chamber at the time of a rise in internal pressure of the primary liquid chamber due to the first resonance in the damping orifice, the second resonance is produced by the hydraulic fluid flowing from the third liquid chamber.

* * * * *